United States Patent
D'Souza et al.

(10) Patent No.: US 9,300,531 B2
(45) Date of Patent: Mar. 29, 2016

(54) SYSTEMS, DEVICES, AND METHODS OF ORCHESTRATION AND APPLICATION OF BUSINESS RULES FOR REAL-TIME CONTROL OF SUBSCRIBERS IN A TELECOMMUNICATIONS OPERATOR'S NETWORK

(71) Applicant: Openet Telecom Ltd., Dublin (IR)

(72) Inventors: Andrew D'Souza, Silver Spring, MD (US); Siobhan Maughan, Dublin (IE); Eamonn Grant, Wicklow (IE); Alan McNamee, Drumcondra (IE); Cameron Ross Dunne, Kildare (IE)

(73) Assignee: Openet Telecom LTD., Dublin (IE)

( * ) Notice: Subject to any disclaimer, the term of this patent is extended or adjusted under 35 U.S.C. 154(b) by 550 days.

(21) Appl. No.: 13/710,695

(22) Filed: Dec. 11, 2012

(65) Prior Publication Data
US 2013/0151710 A1 Jun. 13, 2013

Related U.S. Application Data

(60) Provisional application No. 61/569,677, filed on Dec. 12, 2011.

(51) Int. Cl.
*G06F 15/173* (2006.01)
*H04L 12/24* (2006.01)
(Continued)

(52) U.S. Cl.
CPC ............ *H04L 41/08* (2013.01); *H04L 12/1407* (2013.01); *H04L 12/1442* (2013.01);
(Continued)

(58) Field of Classification Search
CPC . H04L 41/08; H04L 12/1407; H04L 12/1442; H04L 47/20; H04M 15/66; H04M 15/80
See application file for complete search history.

(56) References Cited

U.S. PATENT DOCUMENTS 6,167,445 A 12/2000 Gai et al.
6,308,216 B1 10/2001 Goldszmidt et al.
(Continued)

FOREIGN PATENT DOCUMENTS

EP 2 242 205 A1 10/2010
EP 2 262 199 A1 12/2010
(Continued)

OTHER PUBLICATIONS

Summons to Attend Oral Proceedings Pursuant to Rule 115(1) EPC, 12196685.7-1862, Dec. 1, 2015, European Patent Office.
(Continued)

*Primary Examiner* — Jonathan Bui
(74) *Attorney, Agent, or Firm* — The Marbury Law Group, PLLC

(57) ABSTRACT

The various embodiments include methods, computing devices and communication systems for controlling services in a communications network. A communications server may be configured to receive bounding information from a first server, decision making information from a second server, and a request to generate a decision from any of a number of different systems or components. The communications server may define bounds for generating the decision based on the received bounding information, and generate the decision based on the received decision making information and defined bounds. The communication server may send the generated decision to a third server implementing a functional system, such as a server in policy management system, policy enforcement system, charging system, or mobile application server system.

9 Claims, 14 Drawing Sheets

(51) Int. Cl.
*H04M 15/00* (2006.01)
*H04L 12/813* (2013.01)
*H04L 12/14* (2006.01)
*H04L 12/801* (2013.01)

(52) U.S. Cl.
CPC .............. *H04L47/20* (2013.01); *H04M 15/66* (2013.01); *H04M 15/80* (2013.01); *H04L 12/1403* (2013.01); *H04L 47/14* (2013.01)

(56) References Cited

U.S. PATENT DOCUMENTS

| | | |
|---|---|---|
| 6,363,420 B1 | 3/2002 | Coward |
| 6,427,173 B1 | 7/2002 | Boucher et al. |
| 6,862,281 B1 | 3/2005 | Chandrasekaran |
| 7,107,334 B1 | 9/2006 | Shaffer et al. |
| 7,197,546 B1 | 3/2007 | Bagga et al. |
| 8,023,425 B2 | 9/2011 | Raleigh |
| 2002/0150094 A1 | 10/2002 | Cheng et al. |
| 2003/0065812 A1 | 4/2003 | Beier et al. |
| 2003/0195919 A1 | 10/2003 | Watanuki et al. |
| 2004/0088437 A1 | 5/2004 | Stimac |
| 2006/0047836 A1 | 3/2006 | Rao et al. |
| 2006/0085549 A1 | 4/2006 | Hasti et al. |
| 2006/0165053 A1 | 7/2006 | Bhatnagar et al. |
| 2006/0271813 A1 | 11/2006 | Horton et al. |
| 2007/0143442 A1 | 6/2007 | Zhang et al. |
| 2007/0153995 A1 | 7/2007 | Fang et al. |
| 2007/0258460 A1 | 11/2007 | Momtahan et al. |
| 2007/0283011 A1 | 12/2007 | Rakowski et al. |
| 2008/0046573 A1 | 2/2008 | Ropolyi et al. |
| 2008/0117869 A1 | 5/2008 | Freen et al. |
| 2008/0183991 A1 | 7/2008 | Cosmadopoulos et al. |
| 2008/0212602 A1 | 9/2008 | Hobbs et al. |
| 2008/0216148 A1 | 9/2008 | Bienek et al. |
| 2008/0240150 A1 | 10/2008 | Dias et al. |
| 2009/0025010 A1 | 1/2009 | Foottit et al. |
| 2009/0049201 A1 | 2/2009 | Albert et al. |
| 2009/0063650 A1 | 3/2009 | Anslow et al. |
| 2009/0119742 A1 | 5/2009 | Graziani et al. |
| 2009/0228611 A1 | 9/2009 | Ferguson et al. |
| 2009/0245182 A1* | 10/2009 | Abraham et al. ............. 370/329 |
| 2009/0249452 A1 | 10/2009 | Burke et al. |
| 2009/0285179 A1 | 11/2009 | Jones et al. |
| 2009/0305684 A1 | 12/2009 | Jones et al. |
| 2009/0327207 A1* | 12/2009 | Anderson et al. ............... 706/60 |
| 2010/0017603 A1 | 1/2010 | Jones |
| 2010/0023699 A1 | 1/2010 | Reidel et al. |
| 2010/0035576 A1 | 2/2010 | Jones et al. |
| 2010/0042449 A1 | 2/2010 | Thomas |
| 2010/0188975 A1 | 7/2010 | Raleigh |
| 2010/0197266 A1 | 8/2010 | Raleigh |
| 2010/0262286 A1* | 10/2010 | Eidenberger ......... G06N 99/005 700/246 |
| 2010/0287080 A1 | 11/2010 | Thistle et al. |
| 2011/0044353 A1 | 2/2011 | Foottit et al. |
| 2011/0075671 A1 | 3/2011 | Davidson et al. |
| 2011/0124313 A1 | 5/2011 | Jones |
| 2011/0142006 A1* | 6/2011 | Sachs ............................ 370/331 |
| 2011/0208628 A1 | 8/2011 | Foottit et al. |
| 2011/0219035 A1* | 9/2011 | Korsunsky .............. G06F 17/30 707/784 |
| 2011/0275344 A1 | 11/2011 | Momtahan et al. |
| 2011/0276442 A1 | 11/2011 | Momtahan et al. |
| 2011/0280130 A1 | 11/2011 | Foottit et al. |
| 2012/0026879 A1 | 2/2012 | Foottit et al. |
| 2012/0072592 A1* | 3/2012 | Lidstrom et al. ............. 709/224 |
| 2012/0088470 A1 | 4/2012 | Raleigh |

FOREIGN PATENT DOCUMENTS

| | | | |
|---|---|---|---|
| EP | 2 343 853 | A1 | 7/2011 |
| EP | 2 346 210 | A1 | 7/2011 |
| EP | 2 429 120 | A1 | 3/2012 |
| WO | 02/06973 | A1 | 1/2002 |
| WO | 2008/038862 | A1 | 4/2008 |
| WO | 2009/129840 | A1 | 10/2009 |
| WO | 2009/150042 | A1 | 12/2009 |
| WO | 2010/127593 | A1 | 11/2010 |
| WO | 2010/141727 | A1 | 12/2010 |
| WO | 2010/145717 | A1 | 12/2010 |

OTHER PUBLICATIONS

P. Calhoun et al., Diameter Base Protocol, Network Working Group, Request for Comments: 3588, Category: Standards Track, Sep. 1, 2003.

P. Eronen Ed. et al., Diameter Extensible Authentication Protocol (EAP) Application, Network Working Group, Request for Comments: 4072, Category: Standards Track, Aug. 31, 2005.

J. Wood et al., A Web Services Architecture for Visualization, Fourth IEEE International Conference on eScience, IEEE Computer Society, Dec. 7, 2008.

J. Korhonen Ed. et al., Clarifications on the Routing of Diameter Requests Based on the Username and the Realm, Network Working Group, Request for Comments: 5729, Updates: 3588 Category: Standards Track, Dec. 31, 2009.

http://www.3gpp.org, 3rd Generation Partnership Project; Technical Specification Group Services and System Aspects; Policy and Charging control architecture (Release108), 3GPP TS 23.203 V10.1.0, Sep. 29, 2010. Valbonne, France.

http://www.3gpp.org, 3rd Generation Partnership Project; Technical Specification Group Core Network and Terminals; Policy and Charging Control signalling flows and Quality of Service (QoS) parameter mapping (Release 8), 3GPP TS 29.213 V8.9.1, Oct. 4, 2010. Valbonne, France.

V. Fajardo, Ed. et al., Diameter Base Protocol draft-ietf-dime-rfc3588bis-33.txt, Network Working Group, Internet-Draft, Obsoletes: 3588 5719 (if approved), Intended status: Standards Track, May 7, 2012. (Expires: Nov. 8, 2012).

European Search Report dated Mar. 26, 2012, issued in EP Application No. 11193496, mailed on Apr. 2, 2012.

European Search Report dated Mar. 20, 2012, issued in EP Application No. 11193537, mailed on Apr. 2, 2012.

European Search Report dated Mar. 8, 2012, issued in EP Application No. 11193476, mailed on Apr. 2, 2012.

European Search Report dated Mar. 12, 2012, issued in EP Application No. 11193460, mailed on Apr. 11, 2012.

European Search Report dated Mar. 14, 2012, issued in EP Application No. 11193499, mailed on Apr. 11, 2012.

European Search Report dated May 25, 2012, issued in EP Application No. 11193561, mailed on Jun. 4, 2012.

European Search Report dated Jul. 31, 2012, issued in EP Application No. 12165563, mailed on Aug. 6, 2012.

European Search Report dated Sep. 26, 2012, issued in EP Application No. 12165576, mailed on Oct. 4, 2012.

European Search Report dated Jul. 31, 2012, issued in EP Application No. 12165566, mailed on Aug. 28, 2012.

European Search Report dated Aug. 8, 2012, issued in EP Application No. 12165569, mailed on Aug. 16, 2012.

European Search Report dated Aug. 24, 2012, issued in EP Application No. 12165572, mailed on Sep. 3, 2012.

\* cited by examiner

SYSTEMS, DEVICES, AND METHODS OF ORCHESTRATION AND APPLICATION OF BUSINESS RULES FOR REAL-TIME CONTROL OF SUBSCRIBERS IN A TELECOMMUNICATIONS OPERATOR'S NETWORK

RELATED APPLICATIONS

This application claims the benefit of priority to U.S. Provisional Application No. 61/569,677, titled "Systems, Devices, and Methods of Orchestration and Application of Business Rules for Real-Time Control of Subscribers in a Telecommunications Operator's Network" filed Dec. 12, 2011, the entire contents of which is hereby incorporated by reference.

BACKGROUND

Wireline and wireless communication technologies have seen dramatic improvements over the past few years. Telecommunications network operators/service providers now offer users a wide array of services, higher usage limits, and attractive subscription plans. Wireless dongles and embedded wireless modem cards allow users to use tablet computers, netbooks and laptops to access wireless Internet protocol (IP) and data services through wireless networks. Internet-enabled smart phones, tablets, televisions, and gaming consoles have become essential personal accessories, connecting users to friends, work, leisure activities and entertainment. Users now have more choices and expect to have access to content, data and communications at any time, in any place. As more users utilize these services, telecommunications networks must expand to meet the increase in user demand, support the array of new services and provide fast, reliable communications.

Industry analysts predict that the costs of accommodating the expansion of telecommunications networks will overtake revenues in the next two to five years, challenging the viability of telecommunications network operator/providers' existing business models. Accordingly, cost effective solutions for optimizing the delivery of services, managing network resources, and for implementing dynamic policies and flexible pricing schemes will be beneficial to consumers, network operators, and third-party partners of the network operators.

SUMMARY

The various embodiments include methods of controlling services, which may include receiving bounding information from a first server computing device in a first communication network, receiving decision making information from a second server computing device in a second communication network, receiving a request for a decision defining bounds for generating the decision based on the received bounding information, generating the decision based on the received decision making information and within the defined bounds, and sending the generated decision to a third server computing device implementing a functional system. In an embodiment, generating the decision based on the received decision making information and within the defined bounds may include generating a communication message that includes a decision table generated from a subset of the received decision making information. In a further embodiment, sending the generated decision to a third server computing device implementing a functional system may include sending the communication message to a server configured to execute operations based on information included in the decision table. In a further embodiment, generating the decision based on the received decision making information and within the defined bounds may include traversing a decision table to identify one or more actions corresponding to the decision making information and executing the identified actions.

In a further embodiment, the method may include reorganizing an execution order of the one or more actions based on one or more probability values assigned to the actions. In a further embodiment, receiving bounding information may include receiving information that identifies an upper bound on a maximum amount of latency allowed per decision. In a further embodiment, receiving bounding information may include receiving bounding information in a decision core engine included in a server of a policy management system, a policy enforcement system, a charging system, or a mobile application server system.

In a further embodiment, receiving bounding information may include receiving bounding information in a decision core engine dedicated to machine-to-machine services. In a further embodiment, receiving bounding information may include receiving bounding information in a decision core engine dedicated to services provided by a third party partner. In a further embodiment, receiving bounding information may include receiving bounding information in a decision core engine included in a server of a cloud computing system.

Further embodiments may include a communications server having a memory and a processor coupled to the memory, in which the processor is configured with processor-executable instructions to perform operations that include receiving bounding information from a first server computing device of a first communication network, receiving decision making information from a second server computing device of a second communication network, receiving a request for a decision, defining bounds for generating the decision based on the received bounding information, generating the decision based on the received decision making information and within the defined bounds, and sending the generated decision to a third server computing device implementing a functional system. In further embodiments, the processor may be configured with processor-executable instructions to perform operations corresponding to any of the method steps described above.

Further embodiments may include a non-transitory computer readable storage medium having stored thereon processor-executable software instructions configured to cause a processor to perform operations that include receiving bounding information from a first server computing device of a first communication network, receiving decision making information from a second server computing device of a second communication network, receiving a request for a decision, defining bounds for generating the decision based on the received bounding information, generating the decision based on the received decision making information and within the defined bounds, and sending the generated decision to a third server computing device implementing a functional system. In further embodiments, the on-transitory processor-readable storage medium may store processor-executable instructions configured to cause a processor to perform operations corresponding to the method steps discussed above.

Further embodiments may include a computing device that may include various means for performing functions corresponding to the method operations discussed above.

Further embodiments may include a system having a computing device that includes a transceiver, a memory, and a device processor coupled to the memory and transceiver, and a communications server having a server transceiver, a server memory and a server processor coupled to the server memory, in which the server and/or device processors are configured with processor executable instructions to perform various operations corresponding to the methods discussed above.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
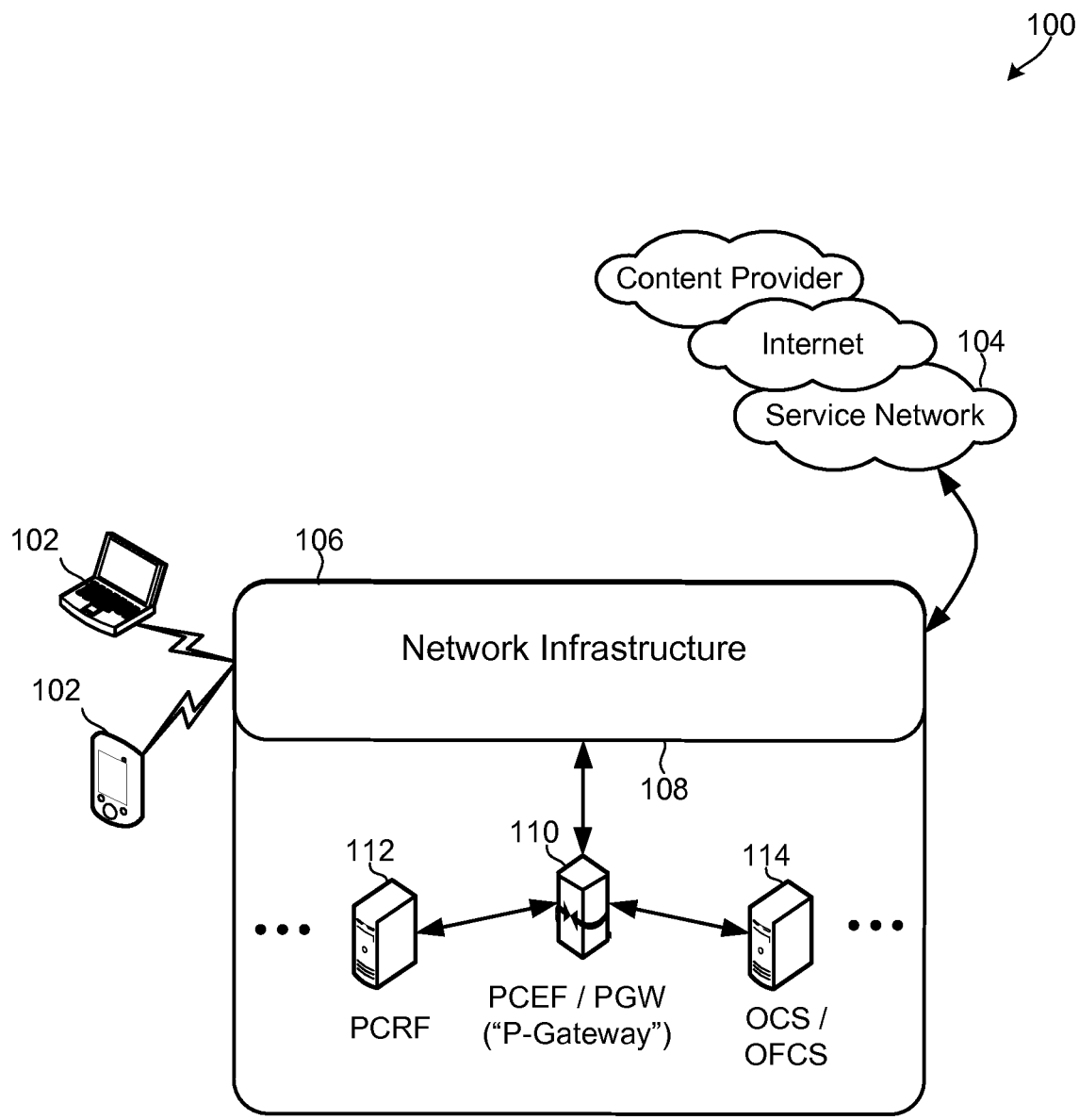
FIG. 1 is a system block diagram illustrating a telecommunications system suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "wireless device" and "user equipment" (UE) may be used interchangeably and refer to any one of various cellular telephones, smart-phones (e.g., iPhone®), personal data assistants (PDA's), palm-top computers, tablet computers (e.g., iPad®), laptop computers, wireless electronic mail receivers (e.g., Blackberry®), VoIP phones, wire-line devices, devices implementing Machine-to-Machine (M2M) technologies, multimedia/Internet enabled cellular telephones, IP enabled televisions, IP enabled entertainment systems, and similar electronic devices that include a processor and are capable of sending and receiving wireless or wireline communication signals.

The terms "telecommunications service provider," "service provider," "telecommunications network operator," and "network operator" may be used interchangeably to refer to any entity or network suitable for providing consumers with access to the Internet or Internet Protocol (IP) data, communications, or other services over a telecommunication network.

The terms "mobile virtual network operator" and "mobile other licensed operator" may be used interchangeably and refer to an entity or network that does not own the radio spectrum or wireless network infrastructure over which it provides consumers with access to IP data, communications, or other services. Typically, a mobile virtual network operator (MVNO) leases radio spectrum or wireless network resources from a telecommunications network operator. Thus, an MVNO may be a third party partner of a telecommunications network operator (e.g., due to existing leasing/business agreements). Other examples of third-party partners may include application providers, content providers, or any other organization from which a telecommunications network operator's subscribers receive goods or services.

As used herein, the term "service" may refer to a telecommunications network operator's offerings (e.g., access to IP data, communications, etc.) as well as offerings from third-parties (e.g., content providers, MVNOs, etc.), which may or may not have a business relationship with the telecommunications network operator.

The term "business rule" may be used herein to refer to software, logic, information, and/or data suitable for describing the terms and conditions under which a telecommunications network operator delivers services to its customers and/or under which a subscriber may use services offered by a telecommunications provider. For example, a business rule (or set of business rules) may define charges that a subscriber incurs for a specific service or set of services, the quality of service provided to the subscriber (e.g., based on pricing plans, historical usage patterns, current network conditions, etc.), the actions to be taken by the operator (e.g., during the user's current session or activity or post-session) when consumption thresholds are exceeded, the types of offers/promotions for which subscribers may be eligible (e.g., based on their set of subscribed services, historical usage, spending history, geographical location, etc.), subscriber preferences for how service delivery is to be managed (e.g., definition of parental controls within the scope of the capabilities supported by the operator's network and support systems, etc.). A business rule may also define a set of policies or guidelines that govern the operation or behavior of an enterprise, network, system, or component. For example, business rules may define how different internal groups or sub-components within an enterprise or network interact with each other, and/or how the enterprise interacts with its customers, partners, suppliers, regulators and other external entities and/or components.

A number of different wireline and wireless communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iden), cable networks (DOCSIS) and other fixed-line networks.

References to terminology and/or technical details related to an individual standard or technology are for illustrative purposes only, and are not intended to limit the scope of the claims to a particular communication system or technology unless specifically recited in the claim language.

In recent years, telecommunications service providers have begun offering many new services, and user equipment (e.g., cellular phones, smartphones, tablets, laptop computers, etc.) has become faster and more feature-rich than ever. For example, modern smartphones have impressive processing capabilities, high speed communication circuitry (e.g., radios, modems, etc.), and are capable of executing powerful network-intensive applications that generate and/or consume large amounts of information over telecommunications and/or IP networks. These advances have resulted in a dramatic increase in the volume of information being communicated on wireless networks, and are driving the ever-increasing customer demand for wireless communications.

To meet user demands for these new applications and services, and to manage the increase in network traffic resulting from the popularity of these services, traditional telephony systems are expanding and converging with IP/data systems. Industry analysts predict that the costs of this expansion will overtake the telecommunications network operator/providers' increase in revenues in the next two to five years, challenging the viability of existing business models.

To reduce costs, meet customer demands, and manage increases in network traffic, telecommunications network operators are offering their customers a variety of new subscription plans (e.g., flat-rate plans, actual usage plans, etc.), and leasing more of their network resources to third parties (e.g., mobile virtual network operators or "MVNOs"). Telecommunications network operators are also deploying various policy solutions (e.g., policy management systems) to better manage and optimize existing network resources. These policy solutions and systems may be coupled with billing/charging systems to improve the efficiency of network resources and enable telecommunications network operators to better monetize their networks.

The coordinated and intelligent use of policy, charging, and/or other functional systems enables telecommunications network operators to better allocate network resources and provide their customers with more intelligent subscription plans/rates. For example, a policy system may be configured to implement dynamic policies/rules suitable for modifying services received by a subscriber, in real time, based on a variety of factors (e.g., subscriber's data usage, network traffic, policy plan changes, etc.). Similarly, a charging system may be configured to access and use subscriber information to implement a flexible pricing scheme that adjusts a subscriber's cost of receiving services, in real-time, based on a wide variety of factors (e.g., amount of money spent consuming services, etc.). The intelligent and coordinated use of policy and charging systems may enable telecommunications network operators to implement dynamic policies and flexible pricing schemes that better utilize network resources/components and improve their profitability.

Policy and charging systems are complex systems, the management and use of which may require a great deal of orchestration across multiple networks, systems, functional groups, and/or components. Due to this complexity, telecommunications network operators generally restrict their third-party partners (e.g., MVNOs, etc.) from having direct access to, or control over, network resources, such as the policy and/or charging systems. As a consequence, third parties cannot make full use of existing policy and charging systems to implement dynamic policies or flexible pricing schemes in an efficient and cost effective manner. This lack of access reduces the benefits, profitability, and/or appeal of leasing network resources from telecommunications network operators, and as a result, fewer third party partners may be willing to lease network resources from the telecommunications network operators.

The various embodiments address the challenges faced by telecommunication network operators as the next generation of telecommunications networks continue to evolve in scale and complexity.

The various embodiments provide systems, devices, and methods for synchronizing communications and coordinating the delivery of services across multiple homogeneous and heterogeneous networks, systems, functional groups, and/or components. Various embodiments enable third-party partners (e.g., MVNOs, etc.) to access and/or have control over existing network resources (e.g., policy and charging systems), while ensuring the reliable, efficient, and profitable end-to-end delivery of services. Various embodiments enable third-party partners to implement dynamic policies and/or flexible pricing schemes in an efficient and cost effective manner.

Various embodiments may include methods, systems and devices that enable telecommunications operators and related enterprises (e.g., partners, MVNOs, etc.) to flexibly define and maintain their policy, charging and business rules, and deliver dynamic decisions based on these rules that affect, in real-time, use of the operator's network and revenue management associated with that use. Various embodiments address the system's integration with external systems that support the operator's business.

Various embodiments may include a business rules domain (BRD) interface or graphical user interface (GUI) configured to provide a single, holistic, cross-functional interface to support the definition and modeling of a telecommunication network operator's business requirements for policy controls, charging, subscriber management and other dynamic service optimization functions. The BRD GUI may provide a central resource that enables definition of business rules that affect multiple network elements. The BRD GUI may be configured so that operators (or third parties) can define business rules for real-time dynamic service controls in their network. The BRD GUI may also provide a test facility to enable new business rules configuration to be tested prior to being deployed in the target systems. The BRD GUI may enforce security policies to ensure that data owned by various entities is kept confidential and secure.

Various embodiments may include a business rules domain orchestrator (BRDO) configured to provide a single orchestration node within the telecommunication network operator's system for all business rules and other critical information that is received from external systems and required for the real-time authorization, service delivery and management of subscribers on the network. The BRDO may provide well-defined integration points for one or more external systems to interface with a decision core engine (DCE), and to distribute information (i.e., decision data, logic and business rules) related to delivery of products and services in the network. The BRDO may be configured to support integration with a plurality of external systems in the operator's environment to accept business rules from one or more external systems and configure these rules in various systems (e.g., charging system, policy management system, etc.) in the operator's network. In an embodiment, configuration information may be defined in systems owned and managed by the operator, or received from external partners.

Various embodiments may include network components configured to enforce business rules in real-time (i.e., with latencies typically between 25-100 ms) as subscribers consume products and services, thus controlling the subscriber's experience dynamically based on changing network conditions (e.g., congestion or user's location) or in the subscriber's account or profile (e.g., usage limit exceeded or a new add-on is purchased).

Various embodiments may include a decision core engine (DCE) configured to enable multi-criteria decision analysis that supports multiple independent business and network functions in an telecommunication network operator's system, and support decisions that are determined by logic in the DCE that models the operator's business rules for charging, policy management, subscriber information management, etc. The DCE may use statistical counters to analyze the use of various blocks of DCE logic, and re-sequence the execution path of this logic to improve system performance. DCE decisions may be made based on complex inputs to the DCE, which may be combined with operator's reference data and data from other external sources. The DCE may deliver decisions within the scope of various contexts based on the external systems that invoke the DCE. The DCE may provide decisions as a set of "output statements," making it easy for the invoking system to process the decision result set. The DCE may provide well-defined integration points for an external system to invoke its decision functions.

In various embodiments, a decision core engine (DCE) may be included in various systems in an operator's network and configured to provide real-time dynamic service controls for subscribers' use of the telecommunications network. A DCE may be embedded in a charging system, a policy management system, and/or a subscriber profile management system. The BRDO component may configure the rules and logic into each instance of the DCE, and these rules and logic may be applied to service requests from the network elements. The DCE moves beyond the various silos of rules traditionally associated one-to-one with individual network elements, providing a holistic and unified means to define, provision, and execute a unified set of rules that coordinate actions across a heterogeneous network environment.

Various embodiments may support multiple instances of a DCE in each network component. Each DCE instance may provide or may be responsible for a different type or group of functions within the operator's network. For example, different DCE instances may be set up to support policy requests and charging requests. Likewise, different DCE instances may be set up to support operator rules for different third party partners, such as MVNOs, etc. A master DCE may route requests to the appropriate child DCE 404-410 instance based on the requesting network element, the type of request (e.g., policy, charging, mediation, etc.), or the "owner" of that request (e.g., operator, MVNO, etc.).

Various embodiments may support multiple instances of a DCE deployed in a cloud computing environment. In such embodiments, one or more DCE instances supporting the same function (policy, charging, mediation, etc.) may be distributed across multiple cloud components. Various embodiments may include master and child DCE instances that are distributed across multiple cloud components.

The various embodiments may be implemented within a variety of communication systems, an example of which is illustrated in FIG. 1. A typical communication system 100 includes user equipment 102 configured to send and receive voice, data, and control signals to and from a service network 104 (and ultimately the Internet and/or a content provider) via a communications network 106. In the example illustrated in FIG. 1, the communications network 106 includes a network infrastructure 108 unit that encapsulates various network components/systems implementing any of a variety of communication technologies/protocols to process and route the voice, data and control signals to and from the user equipment 102. The network infrastructure 108 unit may include, for example, components for implementing a cellular telephone network, a radio access network (e.g., UTRAN, RAN, etc.), WiFi network, WiMAX network, and/or other well known communication technologies (e.g., GPRS, UMTS, LTE, cdmaOne, CDMA2000™. Since these structures are well known, certain details have been omitted in order to focus the descriptions on the most relevant features.

The network infrastructure 108 may also include connections to a policy and charging enforcement function (PCEF) component 110, which may be responsible for enforcing policy rules to control the bandwidth, the quality of service (QoS), and other characteristics of the communications between the service network 104 and the user equipment 102. The enforcement of policies may also include querying, coordinating, removing, revoking and/or adjusting various resources (e.g., network resources, subscriber resources, etc.) based on the policy rules. The PCEF 110 may also be configured to send signaling information (e.g., control plane information relating to communication setup, security, authentication, charging, enforcement of policy rules, etc.) to a policy and charging rules function (PCRF) component 112, online/offline charging systems (OCS/OFCS) 114, and other similar components that participate in, collect information from, or otherwise contribute to, communications between the service network 104 and the user equipment 102.

In an embodiment, the PCEF component 110 may be, or may be included in, a policy management system. In an embodiment, the online/offline charging systems (OCS/OFCS) 114 may be included in a charging system. In an embodiment, the PCEF component 110, PCRF component 112, and online/offline charging systems (OCS/OFCS) 114 may be included in a policy and charging control (PCC) network.

Figure 2:
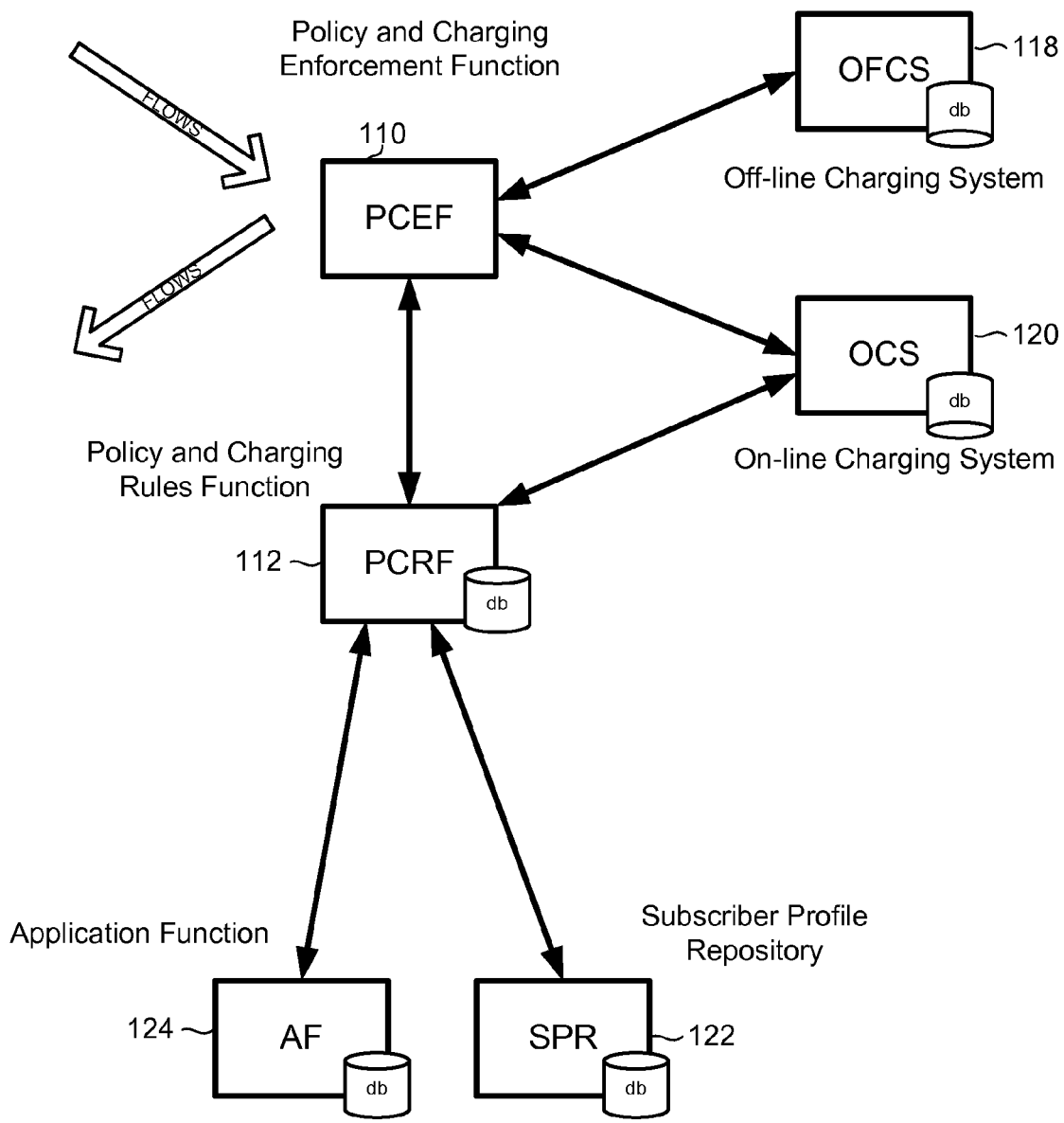
FIG. 2 is a block diagram illustrating logical components and information flows in an example policy and charging control network.

FIG. 2 is an architectural diagram illustrating communications between the various logical components of an example PCC network 200 suitable for use with various embodiments. The PCC network 200 may include a policy and charging enforcement function (PCEF) component 110 that serves as the primary enforcement point, gateway and a routing mechanism between the Internet and the radio infrastructure/radio access network. The PCEF component 110 may be a part of, or perform operations typically associated with, a gateway GPRS support node (GGSN), a packet data network gateway (PGW), or other similar components. Detailed information about policy and charging enforcement function operations may be found in "3rd Generation Partnership Project Technical Specification Group Services and System Embodiments, Policy and Charging Control Architecture," TS 23.203 (updated Jun. 12, 2011), the entire contents of which are incorporated herein by reference.

The PCEF 110 may receive signaling messages from a gateway (e.g., Access Gateway, P-gateway, etc.) and use information contained within the signaling messages to select an optimal route and a quality of service (QoS) for a particular type of services, as well as to enforce various policies on those services. The enforcement of policies may include querying, coordinating, removing, revoking and/or adjusting various resources (e.g., network resources, subscriber resources, etc.) based on a set of policy rules.

The PCEF 110 may enforce policies by implementing a set of policy rules. Each policy rule may govern the services, QoS, and/or bandwidth that are to be made available to a particular subscriber. The policy rules may also govern the times when certain services are made accessible to the subscriber (e.g. weekdays from 9 AM to 5 PM, etc.) and how long the subscriber may access those services (e.g., 15 minutes at a time, a total of two hours, etc.).

The PCRF 112 is responsible for identifying the appropriate policy rules for a given communication session of a given subscriber or terminal device, and sending the identified policy rules to the PCEF 112 for enforcement. Specifically, the PCRF 112 is responsible for generating, compiling, and selecting a set of business and technology rules that define the policies that are to be enforced for particular sessions. The PCRF 112 may make rule decisions on a per-subscriber, per-session and/or per-service basis. For example, the PCRF 112 may use subscriber information (e.g., subscriber's city of residence), the current usage parameters (e.g., day of week, time of day, peak hours, etc.), the subscriber's service level (e.g., Gold, Bronze, etc.), and other information related to the subscriber, session, or service to generate and/or select one or more rules or a rule group. The selected rules or rule group may be communicated to the PCEF 112 (e.g., via the Gx interface) as a profile that defines the policies to be enforced. The PCRF 112 may include one or more databases for storing default rules, maintaining generated rules and keeping track of session information.

The PCRF 112 may request subscriber profile information from the subscriber profile repository (SPR) 122, which maintains subscriber profiles (e.g., customer IDs, preferences, subscription levels, balances, etc.) in one or more data stores.

An application function (AF) 124 represents a node involved in the delivery of an application or service (e.g., voice-over-IP, voice and video call, video-on-demand, etc.) that may be used by a subscriber or that may have dealings with the subscriber. The AF 124 may communicate with the PCRF 112 to ensure that the generated rules are sufficient to provide subscribers with a quality of service (QoS) commensurate with the requirements of their requested services/flows. For example, if a current policy is being enforced based on rules for receiving a particular service (e.g., a voice-over-IP call) and the subscriber requests an additional amount of a given service, or another service (e.g., a voice and video call), the application function 124 component may push a new set of rules to the PCRF 112 reflecting the service changes (e.g., QoS, etc.) required for the additional services. The AF 124 may also store information unique to each subscriber, service, session, and/or application.

In addition to receiving rules from the PCRF 112, the PCEF 110 component may also communicate with an on-line charging system (OCS) 120 and an offline charging system (OFCS) 118 to identify the charging rules that are to be enforced and/or to ensure proper charging. For example, the PCEF 110 may periodically inform the OFCS 118 of the amount of wireless data that is being used by a subscriber. The OFCS 118 may use this information to monitor the aggregate amount of data/service used by each subscriber, and to generate a record that may be collected, processed, formatted, correlated, aggregated, filtered, and/or sent to an external billing system for processing into a billing statement. In order to monitor the data/service usage of each subscriber, the OFCS 118 may store information related to each subscriber, session, and/or service.

The PCEF 110 may also periodically inform the OCS 120 of services requested by a subscriber. The OCS 120 is generally responsible for determining if the subscriber has sufficient funds/credits/access units to receive a requested service. In various embodiments, the OCS 120 may also perform other operations related to charging, balance management and real time rating. The OCS 120 may grant or deny access based on the amount of fund/credits/access units available. In an embodiment, the OCS 120 may manage pre-pay services. In an embodiment, the OCS 120 may manage a combination of pre-pay and post-pay services in which some (or a portion) of the services require a pre-paid balance and some (or a portion) of the services may be billed to the client. In any case, the PCEF 110 may issue requests for service authorization to the OCS 120, and the OCS 120 may respond with a message granting or denying authorization. As part of its operations, the OCS 120 may store information unique to each subscriber, session, and/or service. Also as part of its operations, the OCS 120 may trigger a message to a PCRF 112 to inform it, for example, of changes to a subscriber's state.

In an operator's existing environment, the business rules governing policy and charging decisions for a product or service are generally defined and implemented in a number of different independent systems across the enterprise. For example, the policy rules may be configured in a network-based policy management system (e.g., a PCRF 112, etc.); the charging rules may be configured in a billing system (e.g., OFCS 118, etc.) or a network-based prepaid charging system (e.g., OCS 120, etc.); and the service offering to the market, which typically links the policies and charging rules, may be defined in a product catalog system. Such an arrangement requires the business rules and requirements for product and service offerings to be defined in multiple independent systems in the telecommunications network. Furthermore, the evolving nature of operators' business requirements calls for a great deal of flexibility and coordination among the systems that are responsible for real-time service and subscriber controls.

Figure 3:
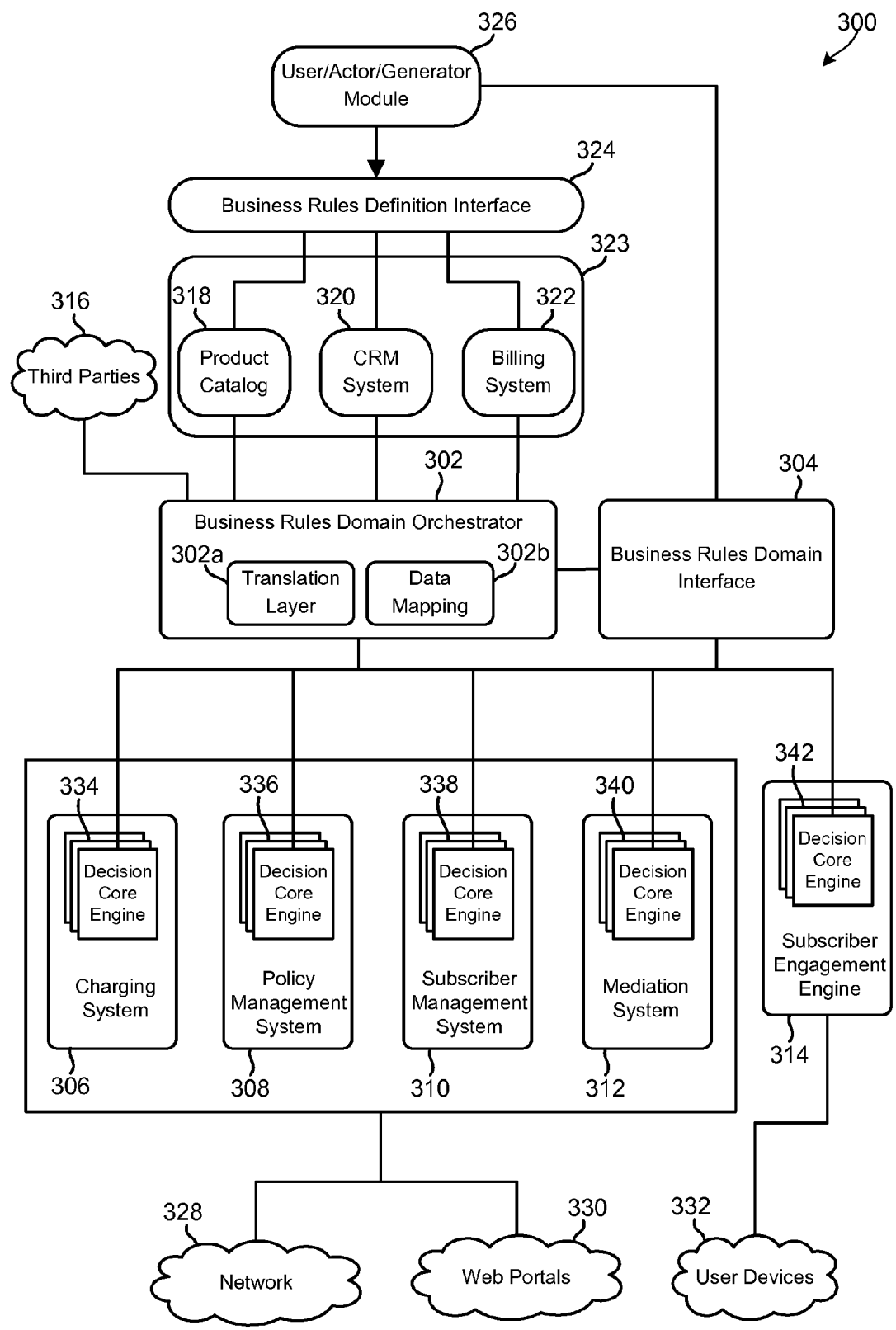
FIG. 3 is a block diagram illustrating information flows and communications links in an embodiment communication system.

FIG. 3 illustrates information flows and communications links in an embodiment communication system 300 configured to provide flexibility and coordination among the various network components and systems responsible for providing real-time service and subscriber controls. In the example illustrated in FIG. 3, the communication system includes a business rules domain orchestrator (BRDO) 302 component and a business rules domain interface 304 component. The communication system 300 may further include (or communicate with) a charging system 306 component, a policy management system 308 component, a subscriber management system 310 component, a mediation system 312 component, a subscriber engagement engine 314, a product catalog 318 component, a customer relationship management system 320 component, a billing and customer care system 322 component, a business rules definition interface 324 component, and a user/actor/generator module 326.

The business rules domain orchestrator (BRDO) 302 may send and receive communications to and from third party 316 servers and networks. The subscriber engagement engine 314 may communicate with a user devices network 332, which may include a plurality of user equipment (UE). Each of the charging system 306, policy management system 308, subscriber management system 310, and mediation system 312 may communicate with web portals or an external telecommunications network operator's network.

The product catalog 318, customer relationship management system 320, and/or billing and customer care system 322 may be external systems 323. The business rules domain orchestrator (BRDO) 302 component may be configured to communicate with (or integrate with) the external systems 323. The external systems 323 may define product offerings, service terms and conditions, pricing plans, and business rules. The business rules may include information for determining how products or services are to be charged to the customer, how the service is to be delivered over the network, and other terms and conditions (e.g., when a subscriber may enter a roaming state, when a subscriber is to be determined as being in a roaming state, etc.).

The charging system 306, policy management system 308, subscriber management system 310, mediation system 312, and subscriber engagement engine 314 components may each include one or more instances of a decision core engine (DCE) 334-342. The decision core engines (DCEs) 334-342 may be configured to process and deliver complex, multi-faceted decisions based on the operator's business rules and/or based on intelligent algorithms that cause the system to analyze data from multiple criteria in combination with operator reference data and with information from other external sources in the operator's network.

The charging system 306 component may be configured to apply rules that establish whether subscribers are authorized to use a service, determine charges associated with consumption of network resources, whether subscribers' account balances are sufficient to support that use of the service, etc. The charging system 306 may invoke a DCE 334 to make charging decisions that may be delivered to the network 328. For example, the charging system 306 may receive a request from the network 328, determine a price, verify that the account balance is sufficient, make a balance reservation or decrement the balance, and return an authorization message to the network 328. Each step in this process may be managed via an instance of the DCE 334. When processing a charging request and the account balance is determined to be insufficient, the charging system's 306 DCE 334 may access decision tables to determine the resulting actions based on the specified decision criteria and outcomes. Charging-related elements of the business rules may be installed in the appropriate instances of the charging system 306 DCE 334. Charging rules may be related to rating or balance management, and each of these may be installed in the appropriate set of decision tables and logic. In an embodiment, the charging system 306 may be an online charging system (OCS 120).

The policy management system 308 component may be configured to determine the policies/business rules that regulate subscribers' use of the telecommunications operator's network. The policy management system 308 may invoke a decision core engine 336 to make policy decisions that are then delivered to the network 328 for enforcement. These policies may be mandated or defined by the telecommunications operator and/or may be selected and configured by the subscribers. In an embodiment, the policy management system 308 may be a policy and charging rules function (e.g., PCRF 112).

In an embodiment, the policy management system's 308 selection and configuration of policy rules may be achieved via client software executing on the user equipment (US) or user devices 332, as is described in U.S. patent application Ser. No. 13/452,670, titled "Systems, Devices, And Methods Of Orchestrating Resources And Services Across Multiple Heterogeneous Domains," filed on Apr. 20, 2012, which claims the benefit of U.S. Provisional Application No. 61/479,136, titled "Mobile Application Server That Enables Users To Directly Access Telecommunications Operator Services" filed on Apr. 26, 2011, the entire contents of all of which are hereby incorporated by reference.

The subscriber management system 310 component may be configured to manage and maintain information relating to subscribers. Some of this information may be permanently managed by subscriber management system 310, such as user specific preferences. Additionally, the subscriber management system 310 may retrieve information from other components within the telecommunications operator's network and OSS/BSS environment. The subscriber management system 310 may invoke a decision core engine 338 to apply specific rules or make decisions related to the processing of information that it receives.

The mediation system 312 component may be configured to collect information from multiple sources, processes the collected information, and distribute the data to one or more downstream systems within the operators OSS/BSS environment, or to systems external to the operator. The mediation system 312 may invoke a decision core engine 340 to apply specific rules or make decisions related to the processing of information that it receives.

The subscriber engagement engine (SEE) 314, also known as the mobile application server (MAS) component, may operate within the telecommunications operator's network and/or may be located behind a firewall and/or a network address translation (NAT) device. The subscriber engagement engine 314 may be a middle-tier application layer that provides subscribers with service management tools via application clients. Applications in this layer may provide the subscriber with insights into and control over their telecommunications services. The subscriber engagement engine 314 may invoke a decision core engine 342 to apply specific rules or make decisions related to the processing of information that it receives.

In the example illustrated in FIG. 3, at least one instance of a decision core engine (DCE) 334-342 is embedded in multiple "host" functional systems in the operator's network, each of which may serve a distinct purpose (e.g., charging, policy, subscriber management, etc). Each instance of the DCE 334-342 may generate DCE decisions, and the DCE decisions may vary based on the system in which the DCE 334-342 resides and the designated function (e.g., operator's rules, MVNO's rules, other partner's rules, etc.) of that DCE 334-342 instance. The context of DCE decisions may vary based on the system (i.e., charging, policy management, subscriber management, etc.) in which it is embedded, and its results may be driven by decision logic using information from various decision tables. In an embodiment, the context of DCE decisions may vary based on the entity that it supports. For example, one DCE 334-342 instance may support operator—defined policy rules, while other DCE 334-342 instances may each support MVNO partners' policy rules. In an embodiment, each DCE 334-342 instance's results may be driven by the configured decision logic and/or using information from various decision tables.

In an embodiment, a decision core engine (DCE) 334-342 instance may trigger calls to other "peer" DCE instances 334-342 (e.g., to complete processing for a specific request, etc.) within the same component or subsystem. For example, a policy manager DCE 336 instance handling a request from one PCEF (e.g., PGW) may call another policy manager DCE 336 instance to push down policy changes to a different PCEF (e.g., video optimizer) in the operator's network. In various embodiments, a DCE 334-342 may implement a translation layer 302a component, a data mapping 302b component, and/or include, provide, or implement any of the other processing solutions, logic, components, systems, and/or modules described herein.

The business rules domain orchestrator (BRDO) 302 may be a single point of integration between one or more decision core engine (DCE) 334-342 instances and one or more external systems (e.g., product catalog 318, etc.) in the operator's OSS/BSS environment (not illustrated). The BRDO 302 component may be configured to receive relevant data from the external system 318-322 and/or business rules domain interface 304, and parse and decompose the business rules into functional elements, messages, logic or internal representations. The BRDO 302 component may update each functional support system's 306-314 decision tables and associated logic, and deliver business rules and other decision criteria to the correct DCE 334-342 instance.

In an embodiment, the BRDO 302 may be configured to collect rules and data from various external systems 318-322. The BRDO 302 may parse, transform and integrate the rules and data into the internal representations suitable for use by a decision core engine (DCE) 334-342, and separate business-level information into discrete items/logical units that support its various decision functions. The internal representations may be a message or data structure that includes one or more structured fields (e.g., a policy and charging rules function identification field, a domain field, an origin-host field, a subscriber identification field, an address field, etc.). The BRDO 302 may have knowledge of the specific function and purpose of each DCE 334-342 instance, and may be responsible for installing in each instance only the logic and rules that are relevant to that DCE 334-342 instance. The BRDO 302 may decompose the business rules into component-specific elements (e.g., charging rules, policy rules, etc.) before they are installed into the respective components.

A telecommunications network operator, generator module 326, and/or a third-party 316 may define and/or manage business rules and decision criteria that relate to real-time network controls and management. The business rules and decision criteria may be defined and/or managed via the business rules definition interface 324 and/or via the business rules domain interface 304, which may be a holistic cross-functional user interface that supports the definition and modeling of the operator's business requirements for policy controls, charging, subscriber management and other dynamic service optimization functions.

In various embodiments, the BRDO 302 may be configured to support any or all of a number of different types of business rules, message formats, models, features, systems, and/or configurations. That is, data received from external systems 318, 320, 322 and/or third parties 316 may vary based on the capabilities of each system and/or based on the specific implementation of the system for a telecommunication network operator. For example, a first telecommunication network operator may be configured so that all charging-related business rules are defined in a billing system (e.g., billing system) and the service delivery policies are defined separately, whereas a second telecommunication network operator may be configured so that all charging and service delivery business rules are defined in a single system (e.g., an enterprise product catalog 318). In addition, a telecommunication network operator may define business rules using different systems, fields, and/or formats based on the type of network. For example, policies and/or business rules for a telecommunication network operator's mobile network may be defined separately from policies/rules for that operator's fixed-line network. In each of these cases, information included in the business rules (and the operations or actions performed to implement the business rules) may be different (e.g., different content, fields, structure, format, etc.).

In an embodiment, the BRDO 302 may include a translation layer 302a module and data mapping 302b module configured to define how the incoming information is processed and delivered to the appropriate system (e.g., charging system 306, policy management system 308, etc.). The translation layer 302a and data mapping 302b modules may be implemented differently for different external systems (e.g., by using reference tables, schema definition documents, etc.) and/or or configured to support a wide variety of different business rules, data formats, external systems, functional systems, networks, network technologies, etc. In this manner, the BRDO 302 may support a wide variety of different business rule types, message formats, models, features, systems, and/or configurations.

In an embodiment, the BRDO 302 may be configured to support flexible handling of the incoming business rules. For example, the BRDO 302 may be configured to process a specific set of discrete policy rules from an external operator system and/or process an amalgamated "policy profile" from third parties 316, such as a mobile virtual network operator (MVNO) or third party partner's systems/components.

In an embodiment, the BRDO 302 may include a well-defined published external interface through which operator systems and/or third-party 316 systems may deliver business rules. The translation layer 302a and data mapping 302b modules may validate and process the incoming information, and may use a set of configured rules (or configurable business rules) to determine how this data is directed. The configured rules may specify, for example, whether a specific rule (or set of rules) is charging or policy related, and in which charging systems or policy systems the correct DCE instance resides. The configured rules may also define the how a master DCE instance is updated (i.e., when a master instance exists). For example, configured rules may specify that the policy-related elements of the business rules for mobile networks are installed in one policy management system DCE instance, rules for fixed-line networks are installed in a different policy management system DCE instance, and rules for an MVNO partner are installed in yet another policy management system DCE instance. In an embodiment, the configured rules may be configurable business rules.

The business rules domain interface 304 component may be a holistic cross-functional user interface that supports the definition and modeling of the operator's business requirements for policy controls, charging, subscriber management and other dynamic service optimization functions. The business rules domain interface 304 may include/provide user-friendly tasks and workflows that are specific to the user's or a third party vendor's objectives or business needs. This workflow application may break down the overall configuration into a series of modular steps across which a user may easily navigate.

The business rules domain interface 304 may include resources that enable a user to walk through a step-by-step definition of a decision configuration. These step-by-step definitions may include steps for defining price plan attributes (e.g., price plan name, charges, usage caps/limits, default notification thresholds, etc.), rating rules, prices, actions to be taken when a subscriber exceeds the price plan usage limit (e.g., overage charges, automatic plan renewal and renewal charges, etc.), related service controls and quality of experience parameters (e.g., speed tiers for service delivery across multiple network elements (e.g., PGW or BRAS) and network types (mobile, fixed-line, Wi-Fi)), restrictions or limits on service delivery of specific applications or content, pricing rules and service parameters for roaming subscribers, etc.

The business rules domain interface 304 may be configured so that expert users may bypass the structured workflow and navigate directly to each of the sections that are required for a specific configuration. The business rules domain interface 304 may be configured so that different tasks within the business rules definition may be performed by different users, with the business rules domain interface 304 routing tasks to the appropriate users or groups within the operator's organization. The business rules domain interface 304 may be configured to manage dependencies between the various business rules definition tasks. In an embodiment, business rule definition tasks may be performed in parallel, such as via a general purpose graphical processing unit (GPGPU).

In an embodiment, the business rules domain interface 304 may include user input keys or buttons (e.g., "next" and "back" buttons) that enable a user may navigate between each of these decision windows. The business rules domain interface 304 may validate data entered at each step before permitting the user to move forward or back to another decision window. Once the configuration is completed, the user may click a "finish" button at which point the system processes the information, and may offer the user an option to test the newly defined configuration.

In an embodiment, the business rules domain interface 304 may interface with other systems in the operator's environment to present the user with existing data from which selections may be made or to validate information entered by the user. For example, a list of price plans may be obtained from the billing system and presented to the user.

In an embodiment, the business rules domain interface 304 may itself contain an embedded DCE instance (not illustrated) whose configured rules and logic operate on the user entered data to perform validations and deliver the relevant information to the appropriate charging, policy or other recipient systems.

In an embodiment, the business rules domain interface 304 may provide a test facility to enable an authorized user to test the business rules, logic and other decision criteria prior to installing these in the target systems. The test facility may include configurable simulators, transaction generators and test scenarios to enable user testing.

In an embodiment, the business rules domain interface 304 may enforce security policies on the various decision criteria so that information for a given entity (e.g., operator, MVNO, partner, etc.) is accessible only by authorized users belonging to that entity. Various other levels of user access controls, such as read-only or test-only, may be enforced by the GUI.

Business rules and logic may be stored directly in the various decision core engine (DCE) structures, where they are then available to support real-time requests from the network or other external requesting systems. The system 300 may be configured to load the decision core engine data and logic directly using other tools or utilities, such as scripts or a command line interface. In an alternative embodiment, the system 300 may be configured to export or extract information from the decision core engine using similar tools or utilities.

Configured rules and processing logic may be implemented in one or more DCE instances within the BRDO 302 component, such as via decision tables. Decision tables may be composed of rows and columns, with each entry defining the decision criteria (i.e., inputs) and the required actions (i.e., outputs). When the input conditions of any given rule/decision table are met, the actions specified for that entry may be performed. These actions may be prioritized for execution and/or may be used as input to another set of decision tables or as input to another instance of a DCE. Decision table entries may be added, updated or deleted as business requirements evolve and/or the business rules are modified or updated. These entries may also be effective-dated to allow the corresponding business rules to "expire" after a defined time period. These decision tables may support entries that are effective-dated to allow rules that become "active" at some point in the future; that is, the entries may be installed in advance of them needing to be used.

Supporting logic for a decision table may be used to define preconditions that limit the scope of the rules in that decision table. Preconditions may be tested before the rules in a decision table are evaluated and executed. For example, an instance of a decision table may contain charging-related rules for MVNO x and so preconditions may be defined as an evaluation of information on the incoming request to determine if it is related to a subscriber owned by MVNO x. When it is, that charging request may be processed using that instance of the decision table. When it is not, then the supporting logic may direct the subsequent processing of that charging request to a different decision table.

As discussed above, a DCE may include a decision table that defines decision criteria (i.e., inputs) and actions (i.e., outputs). The DCE may receive a request for a decision, identify decision criteria in the decision table corresponding to information included in the received request, determine whether the requirements specified by the decision criteria are met, identify the corresponding actions specified in the decision table, and perform the actions corresponding the decision criteria to generate output. The generated output may include any or all of an algorithm, logic, software instructions or code, output statements, policy rules, charging rules, decision response messages, service authorization messages, etc.

In an embodiment, the DCE may be configured to generate a reduced decision set as an output. For example, the DCE may receive a request for a decision that requires the execution of four blocks of logic based on fields that include "day of week," "application name," "subscription plan," and "network load." If the DCE is bound or restricted from accessing information relating to the "application name" block of logic, the DCE may generate a reduced decision set based on the execution of blocks of logic corresponding to the "day of week," "subscription plan," and "network load" fields. The reduced decision set may be sent to the subsequent network component or user equipment, which may supplement the reduced decision set with the missing information (i.e., information generated from the execution of the "application name" block of logic) or perform the relevant operations based on the reduced decision set.

In an embodiment, the DCE may be configured to perform decision reordering operations. The DCE may reorder the decision blocks as is necessary to reduce the number of operations required to generate output (e.g., a decision, a response to a decision request, etc.). This reordering may occur on a once-off basis, at fixed intervals, in response to events or stimuli, periodically, or continuously. One or more factors (e.g. probabilities, computational costs, etc.) may be used to determine the new order of the decision blocks. For example, consider the following decision tree consisting of Boolean tests A, B, and C:

```
If (A) then PermitService;        // Block 1
Else If (B) PermitService;        // Block 2
Else If (C) PermitService;        // Block 3
Else DenyService;                 // Block 4
```

The DCE may begin operation with this decision tree, and store statistical information about the execution of each block within the tree. The statistical information may include the frequency with which each block occurs, the probability of each block being the final block to execute, etc. For example, the DCE may observe the following probabilities:

| Block | Probability of being the final block to execute |
|---|---|
| 1 | 0.1 |
| 2 | 0.3 |
| 3 | 0.5 |
| 4 | 0.1 |

The DCE may reorder the blocks so the block that is most likely to be the final block to execute is executed first, and the block that is second most likely to be the final block to execute is executed second, etc. This would result in the following modified decision tree:

```
If (C) then PermitService;        // Block 3
Else If (B) PermitService;        // Block 2
Else If (A) PermitService;        // Block 1
Else DenyService;                 // Block 4
```

This rearrangement of the blocks may improve the efficiency of the DCE due to it minimizing the number of decisions that need to be made to determine the final action that is to be performed. In the above example, the DCE may determine half of all final actions with the execution of a single decision block (i.e., due to determining that there is a 50% probability of block 3 being the final block to execute and reordering the execution order to perform the operations of block 3 first). To achieve this, in an embodiment, the DCE may have semantic knowledge of the decision blocks that enables the DCE to reorder the decision blocks. For example, the DCE may determine that block 4 is a catchall block, and order the blocks so that block 4 is the last block to be executed.

The above example assumes that the Boolean tests A, B, and C are stateless tests on immutable variables (i.e. the determination of the Boolean test does not have any side effects that change any system state). An example of such a stateless test may include test that determines "Is the subscriber a corporate subscriber?" However, the DCE may also be configured to determine whether a Boolean test changes the system state (e.g. "Does the subscriber have more than $3 of credit after giving him/her a bonus gift of $1?"), and hence ensure that the Boolean test is always executed regardless of which block is the last block to execute.

In various embodiments, the DCE may be configured to evaluate decision making information at "configuration time" or when the decision making information is being input to the system to generate decision trees that are within the defined bounds and/or comply with the requirements identified in bounding information received by the DCE. For example, a DCE may receive bounding information that specifies an upper bound on the maximum latency allowed per decision. Such bounding information may include latency information for each type of information being used in the decision blocks, such as shown in the following table:

| Information Type | Maximum Latency |
|---|---|
| Subscriber's balance | 40 ms |
| Subscriber's history | 100 ms |
| Date/Time | 5 ms |

With reference to the above example, when bounding information received by the DCE specifies an upper bound on the maximum latency allowed per decision tree of 70 ms, the DCE may generate a decision tree having one decision block based on the subscribers balance (40 ms) and up to six date and time decision blocks (5 ms each), but choose not to generate a decision tree containing two decision blocks based on the subscriber's balance (totaling 80 ms) or a decision block based upon the subscriber's history (100 ms).

In an embodiment, the DCE may be configured to evaluate the decision making information at runtime. For example, the bounding information received by the DCE may limit the aggregate bandwidth being consumed by all subscribers to a maximum of 3 GB/s. In this example, the DCE may determine the aggregate bandwidth at runtime before allocating new bandwidth resources based on the outcome of the decisions.

Figure 4:
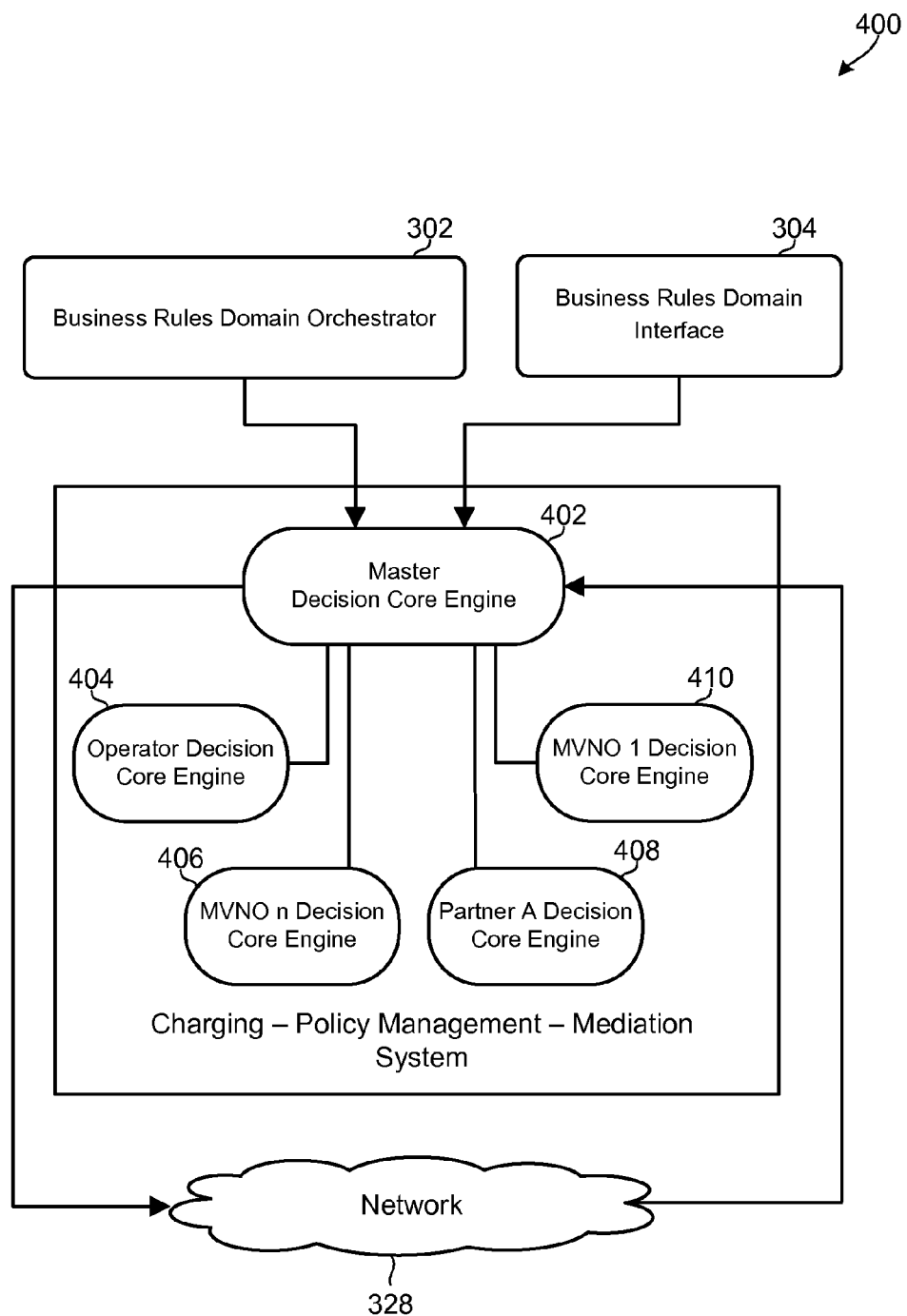
FIG. 4 is a block diagram illustrating an example communication system that includes an embodiment master decision core engine suitable for defining and delivering complex, multi-faceted decisions based on the operator's business rules and intelligent algorithms that analyze data from multiple criteria.

FIG. 4 illustrates an embodiment system 400 that includes a master decision core engine (DCE) 402 suitable for defining and delivering complex, multi-faceted decisions based on the operator's business rules and based on intelligent algorithms that analyze data from multiple criteria in combination with operator reference data and with information from other external sources in the operator's network.

The master DCE 402 may be responsible for directing each incoming request to the appropriate "child" DCE 404-410 instance, each of which may be installed in a functional system component (e.g., Policy management system 308, charging system 306, etc.). The master DCE 402 instance may also manage the provisioning of business rules and logic into the appropriate instance(s) of the "child" DCE 404-410.

Each set of new or updated business rules or information may be evaluated in the master DCE 402 and, based on the results of this evaluation, configured into the appropriate "child" DCE 404-410 instance. Similarly, each incoming decision request may be evaluated in the master DCE 402 and directed to the appropriate "child" DCE 404-410 instance for further processing. In this manner, various embodiments enable the "partitioning" of the decision logic, decision tables and other criteria in each "child" DCE 404-410 instance to ensure partner confidentiality, information security and more effective rules management.

In an embodiment one or more child DCE instances may be grouped into a logical instance (i.e. a "sandbox") that is dedicated to a specific third-party partner or group of partners. In an embodiment of this sandbox concept, a logical instance of a child DCE group may be reserved for supporting only a limited set of customers or services. For example, a dedicated logical DCE instance for machine-to-machine services or services for a specific group of machine-to-machine applications (e.g., medical or automotive). Another example is a dedicated logical DCE instance reserved for a large corporate customer. The BRDO is capable of recognizing these logical instances and installing the appropriate set of business rules based on the designated purpose of each instance.

Figure 5:
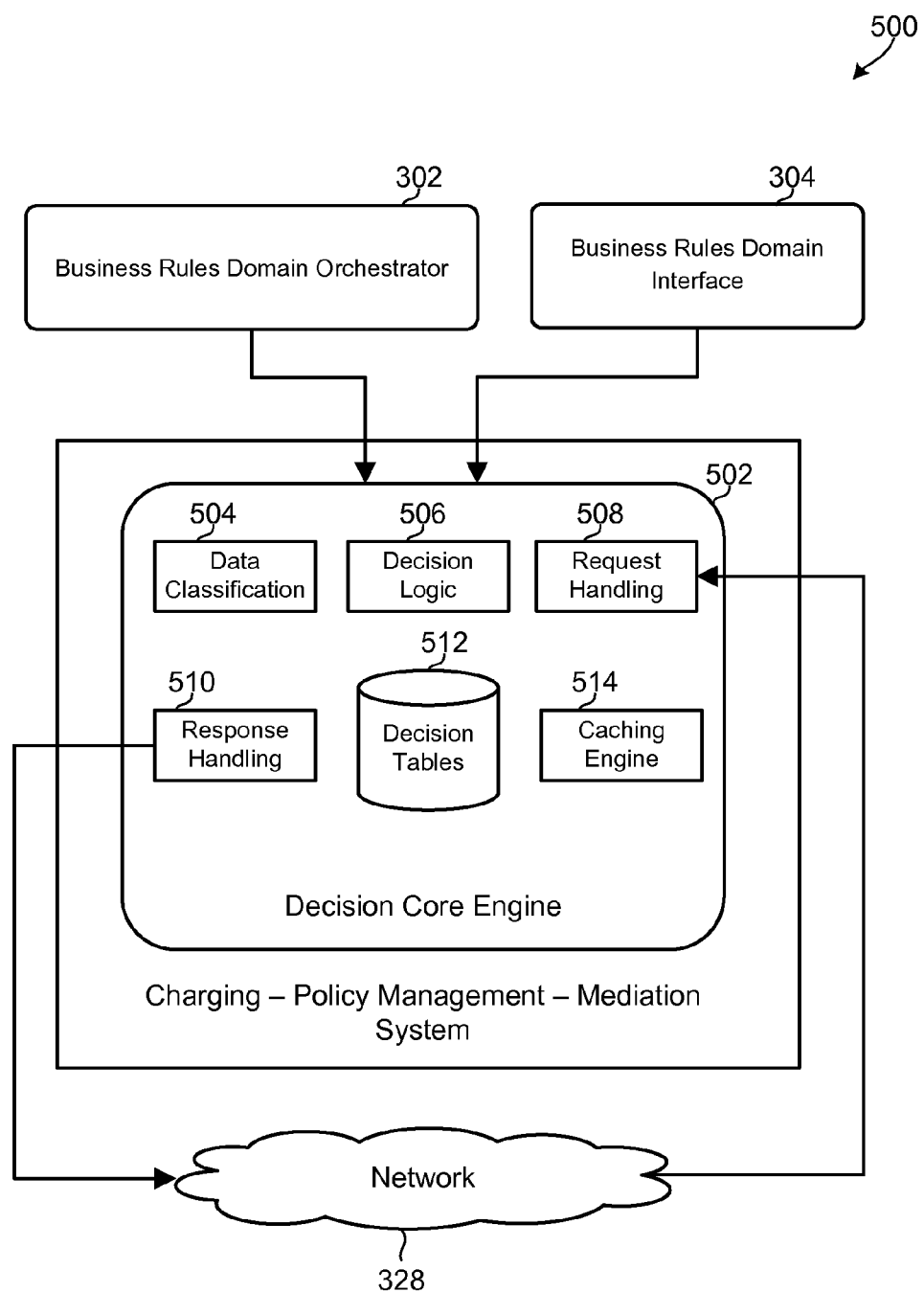
FIG. 5 is a block diagram illustrating information flows and logical components in an example communication system in which an embodiment decision core engine may be deployed.

FIG. 5 illustrates information flows and logical components in an example communication system 500 in which an embodiment decision core engine (DCE) 502 may be deployed. An embodiment DCE 502 may include a data classification 504 module, a decision logic 506 module, a request handling 508 module, a response handling 510 module, a decision tables 512 component, and a caching engine 514.

The caching engine 514 may cache information within the decision core engine (DCE) 502 to improve its performance. The cached information may relate to policy information, charging information, or any other subscriber or system information. The caching engine 514 may include customized application-aware caching algorithms. The caching engine 514 may preemptively cache data based upon the subscribers' past actions, their probable future actions, and any other relevant contextual information. For example, the caching engine 514 may use different caching algorithms for caching a subscriber's balance based upon whether the subscriber's active charging is event based charging or session based charging. The caching engine 514 may also using traditional or generic caching techniques to improve the performance of the DCE 502.

The request handling 508 module may handle incoming decision requests from external systems and/or perform any additional processing required by the decision logic. For example, the request handling 508 module may parse an input attribute or combine the input attribute with another attribute before the decision logic is invoked.

The data classification 504 module may perform additional processing on the incoming request to classify the event based on operator-defined rules. This processing may include one or more reference table look ups in order to complete the classification step. For example, an incoming request from a charging system may use a reference table look up of attributes in that request to determine when the subscriber is roaming.

The decision tables 512 component may include definitions of mappings that define the outcomes for a specific set of input criteria. The resulting outcome may be used by the decision logic to direct the subsequent processing of the request. For example, a decision table 512 used in the processing of charging requests may define the rule for handling a subscriber who has exceeded their monthly usage threshold, which may trigger the automatic provisioning of an additional data allowance (1 GB) for a specified fee ($15).

The decision logic 506 module may include complex Boolean, conditional, iteration constructs and expressions, and/or provide a flexible mechanism to enable the modeling of operators' business rules and requirements for processing incoming decision requests. The decision logic 506 module may use multi-valued inputs along with the results from the data classification 504 and the decision tables 512 component to provide a flexible logic path to arriving at a resulting decision. This logic may also define the specific processing steps required for each type of incoming request. In an alternative embodiment, each DCE logic block may have an associated statistical counter that is incremented each time that particular block is executed. Trend analysis over a period of time may be used to determine which particular conditions are executed most frequently, and this information may be used to re-sequence the logic to further improve performance. Various embodiments may include modules configured to perform automated re-sequencing of the logic steps. In an embodiment, the DCE 502 may be configured to employ general-purpose computation on graphics processing units (GPGPU) or other similar high performance computing techniques to optimize the system.

The response handling 510 module may process and format outbound responses from the DCE 502 to external systems. Each incoming request may result in one or more output statements that are sent to the invoking system and other external systems (e.g., notification server, policy management system, etc.), and which these systems may act on. When a particular DCE instance serves as a master DCE, its decision tables and decision logic may contain rules that form the basis for the processing of incoming requests to that instance. These rules may enable the master DCE to direct a request to the appropriate "child" DCE instance for further processing, and then return the decision response to the requesting system.

Figure 6:
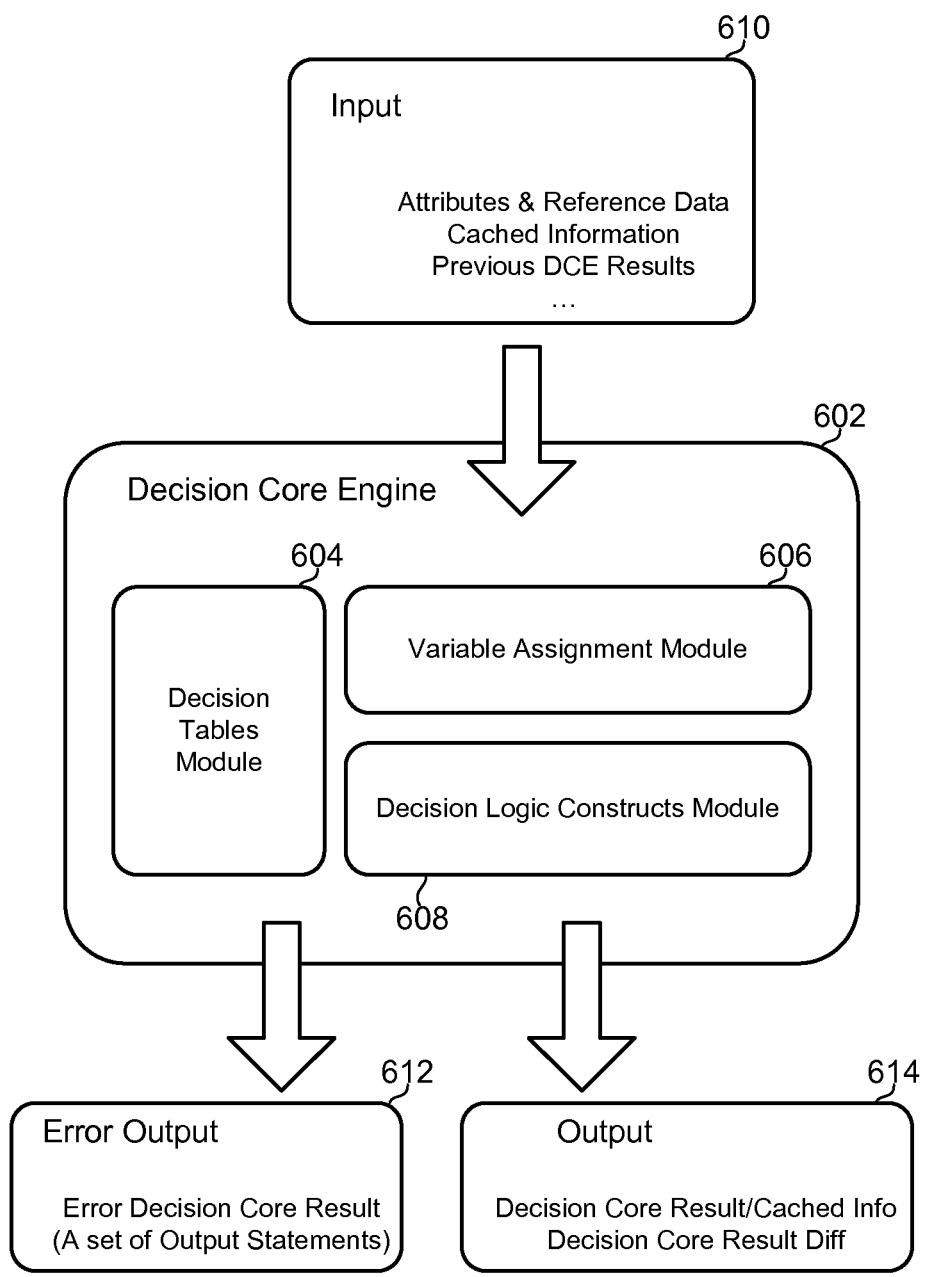
FIG. 6 is a block diagram illustrating information flows and logical components in an embodiment decision core engine.

FIG. 6 illustrates information flows and logical components in an embodiment decision core engine (DCE) 602. In the example illustrated in FIG. 6, the DCE 602 includes a decision tables 604 module, variable assignment 606 module, and decision logic constructs 608 module. The decision tables 604 and/or variable assignment 606 module may include definitions of mappings that define the outcomes for a specific set of input criteria. The decision logic constructs 608 may include complex Boolean, conditional, iteration constructs and expressions, and/or provide a flexible mechanism to enable the modeling of operators' business rules and requirements for processing incoming decision requests.

The DCE 602 may be configured to receive various inputs 610, such as attributes and reference data, cached information, and previous DCE results, and generate error output 612 and/or output 614. The error output 612 may include error decision core results, which may be a set of output statements. The output 614 may include decision core results, cached information, and a diff or comparison of the decision core results.

The DCE 602 may be configured so that a single set of functions that may be used to define and configure decision criteria based on a modeling of an operator's business requirements. The DCE 602 may support decision capabilities in a variety of contexts including, for example, decisions related to policies for subscribers' use of network resources, decisions related to how subscribers are charged for their use of the network and its services and applications, and decisions related to how subscribers' activity is managed in the network.

Figure 7A:
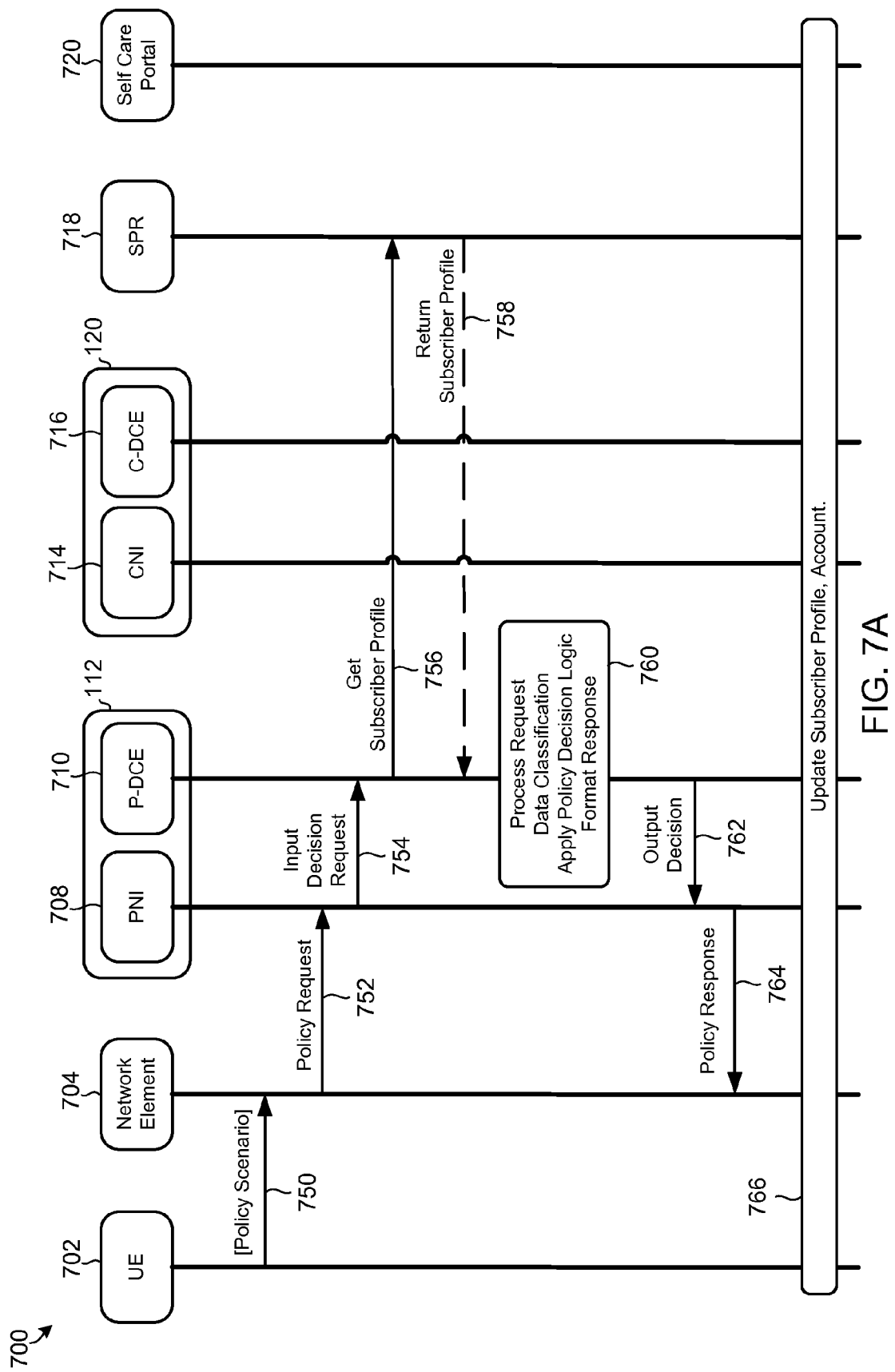
FIGS. 7A-C are process flow diagrams illustrating embodiment decision core engine methods of controlling existing network resources while achieving reliable, efficient, and profitable end-to-end delivery of services.
Figure 7B:
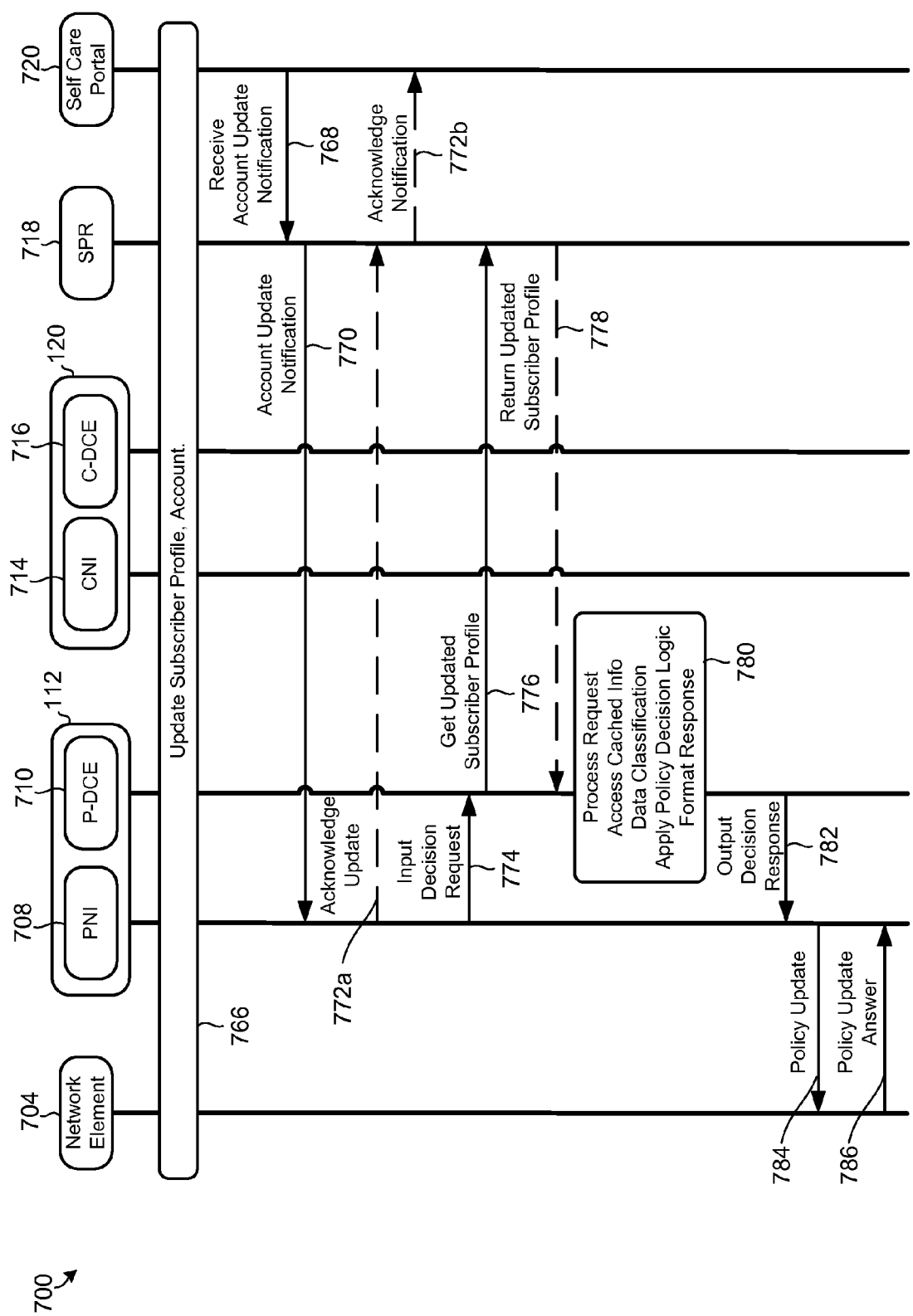
Figure 7C:
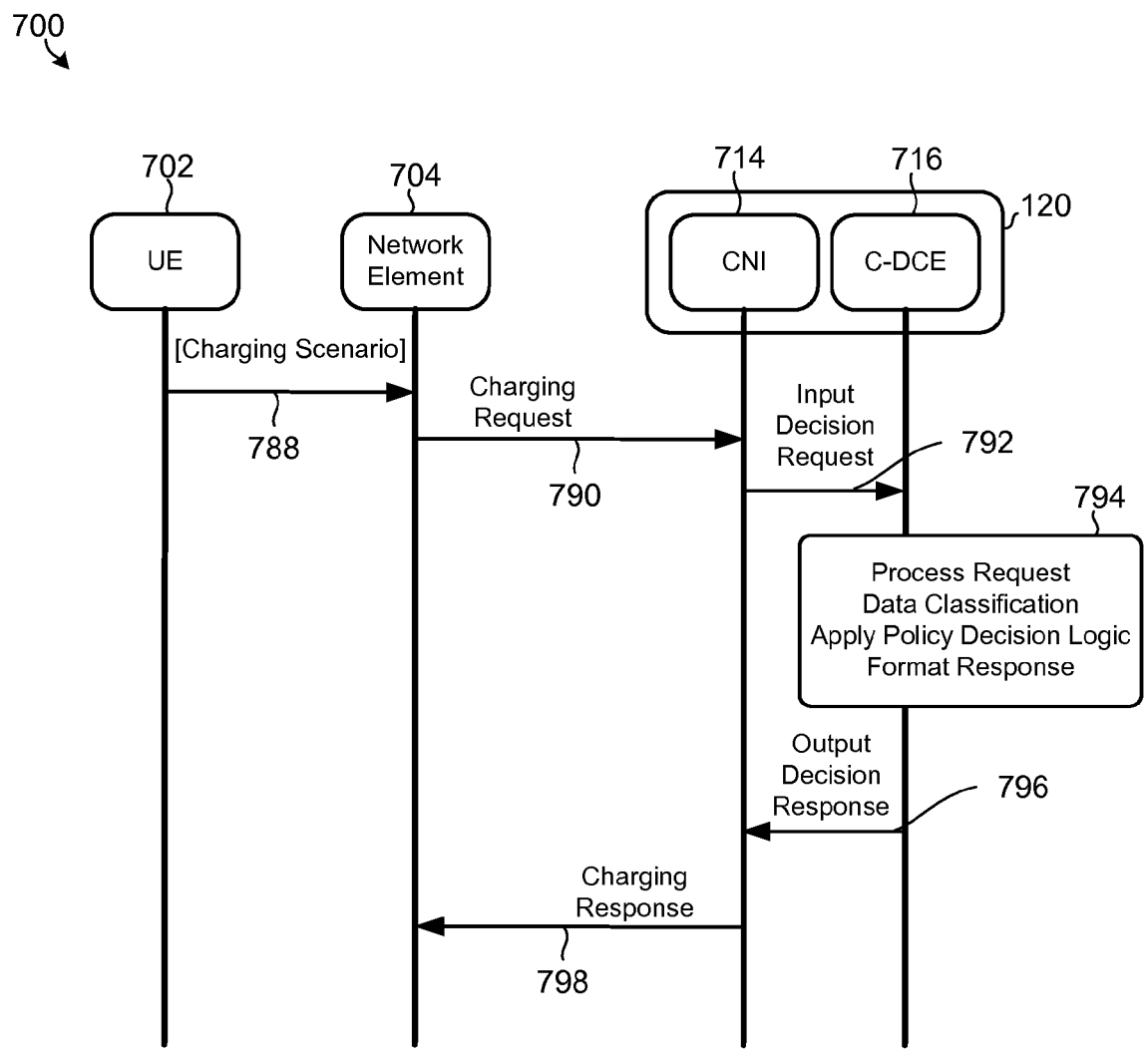

FIGS. 7A-C illustrate an embodiment decision core engine (DCE) method 700 of controlling existing network resources (e.g., policy and charging systems), while ensuring the reliable, efficient, and profitable end-to-end delivery of services. Specifically, FIGS. 7A-B illustrate operations for controlling a policy system, and FIG. 7C illustrates operations for controlling a charging system. Any or all of the operations illustrated in FIGS. 7A-C may be performed by a processor of one or more computing devices, such as a server in the telecommunications network operator's network.

In operation 750 of method 700, user equipment (UE) 702 may initiate a policy scenario by, for example, requesting to receive IP data services via the telecommunication network operator's network. In operation 752, a network element 704 (e.g., PCEF, P-GW, etc.) may send a policy request to a policy network interface (PNI) 708 of a policy management system, such as the illustrated PCRF 112. In operation 754, the policy network interface 708 may send an input decision request to a policy decision core engine (P-DCE) 710 in the PCRF 112. In operation 756, the policy decision core engine 710 may request (e.g., via a "Get" command) a subscriber profile from an SPR 718. In operation 758, the SPR 718 may retrieve the subscriber profile and return the results to the policy decision core engine 710.

In operation 760, the policy decision core engine 710 may decode the subscriber profile, process the policy request using information obtained from the subscriber profile, perform data classification operations, apply policy decision logic, and/or generate or format a response based on the results of the application of decision logic. In operation 762, the policy decision core engine 710 may send an output decision to the policy network interface 708 of the PCRF 112. In operation 764, the policy network interface 708 may send a policy response to the network element 704.

In operation 766, any or all of the components 702-720 my update their subscriber profile and/or account information. In operation 768, the self care portal may receive an account update notification and/or send an account update notification to a subscriber profile repository (SPR) 718. In operation 770, the subscriber profile repository 718 may send an account update notification to the policy network interface 708 of the PCRF 112. In operation 772a, the policy network interface 708 may send acknowledgment notification to the subscriber profile repository 718. In operation 772b, the subscriber profile repository 718 may send an acknowledgment notification to the self care portal 720.

In operation 774, the policy network interface 708 may send an input decision request to the policy decision core engine 710 of the PCRF 112. In operation 776, the policy decision core engine 710 may request (e.g., via a "Get" command) an updated subscriber profile from the subscriber profile repository 718. In operation 778, the subscriber profile repository 718 may send an updated subscriber profile to the policy decision core engine 710.

In operation 780, the policy decision core engine 710 may process the policy request using information obtained from the updated subscriber profile, access cached or stored information, perform data classification operations, apply policy decision logic, and generate/format an output decision response based on the results of the application of decision logic. In operation 782, the policy decision core engine 710 may send the output decision response to the policy network interface 708. In operation 784, the policy network interface 708 may send a policy update to the network element 704 (e.g., PCEF, P-GW, etc.). In operation 786, the network element 704 may send a policy update answer to the policy network interface 708.

With reference to FIG. 7C, in operation 788, the user equipment 702 may initiate a charging scenario by, for example, requesting services over the telecommunication network operator's network. Alternatively, the policy management system 706 and/or the network element 704 may initiate the charging scenario. In an embodiment, the user equipment 702 may interact with a third-party component, such as a partner's application server, that initiates the charging request.

In operation 790, the network element 704 may send a charging request to a charging network interface 714 of an online charging system 120. In operation 792, the charging network interface 714 may send an input decision request to a charging decision core engine 716 in the online charging system 120. In operation 794, the charging decision core engine 716 may process the charging request (e.g., using information obtained from the subscriber profile, SPR, charging databases, etc.), perform data classification operations, apply policy decision logic, and generate/format an output decision response based on the results of the application of decision logic. In operation 796, the charging system may send the output decision response to the charging network interface 714. In operation 798, the charging network interface 714 may send a charging response to the network element 704 for enforcement.

Figure 8A:
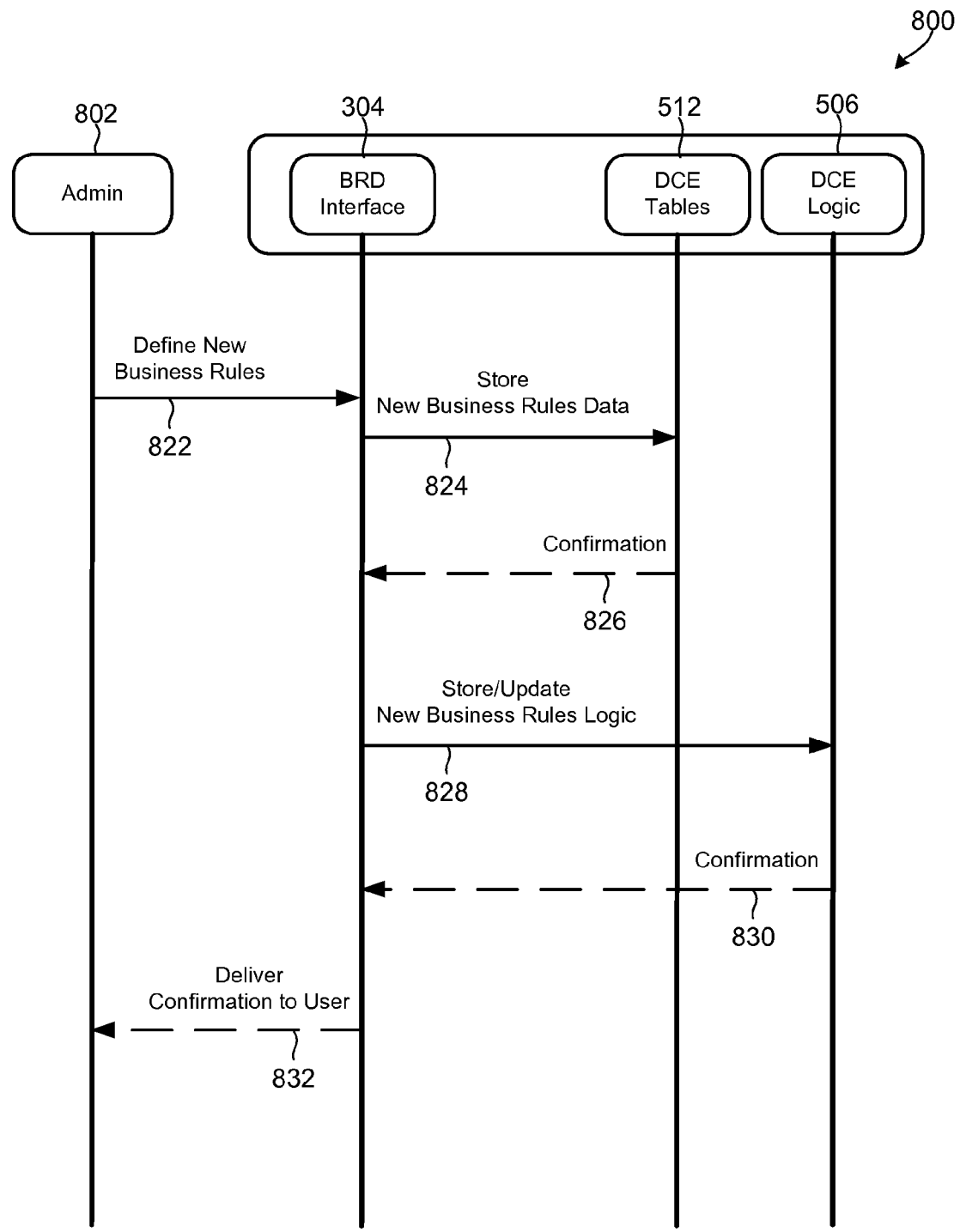
FIGS. 8A-B are process flow diagrams illustrating embodiment methods of configuring business rules in a decision core engine.
Figure 8B:
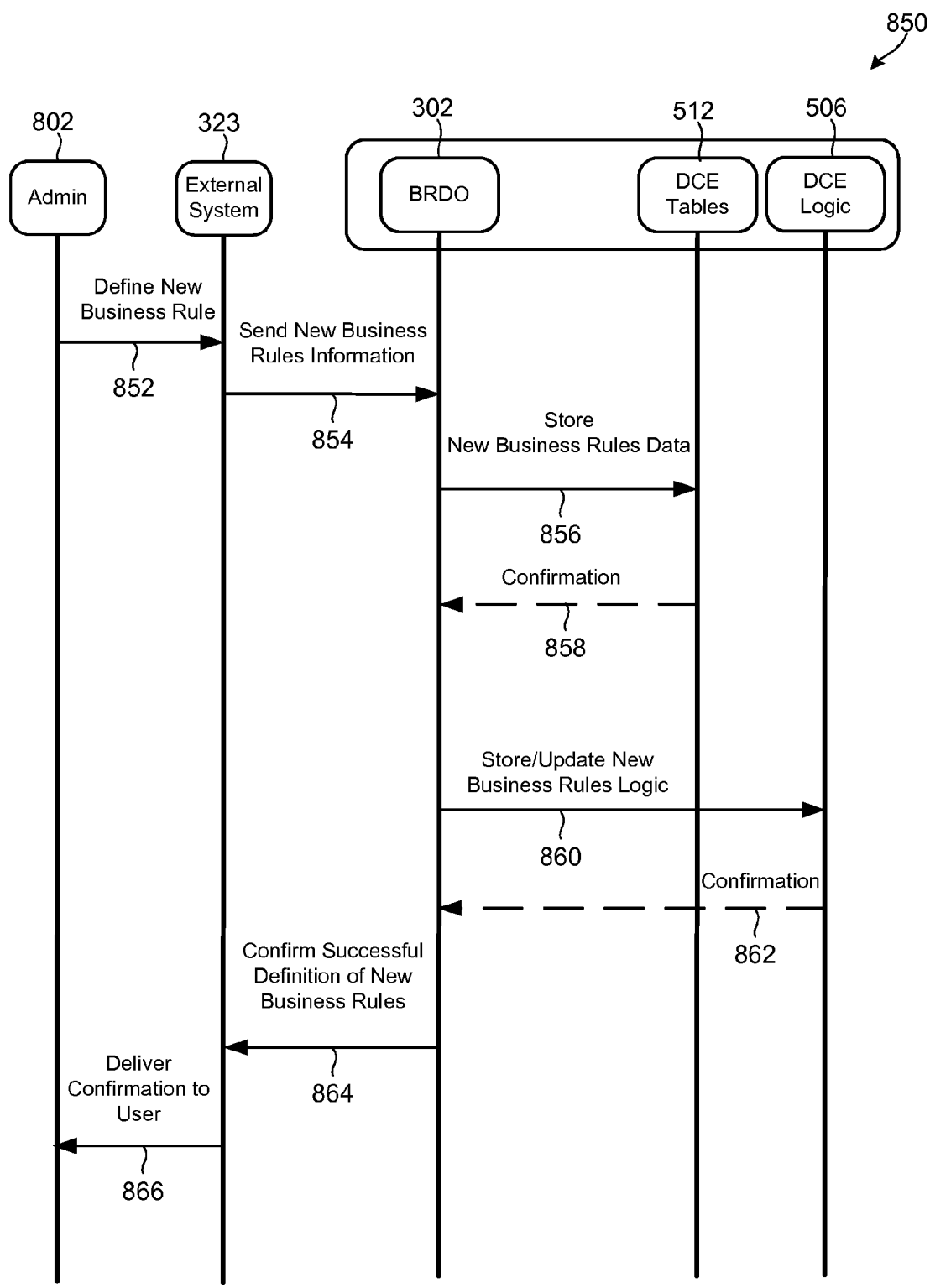

FIGS. 8A-B illustrate embodiment methods 800, 850 for configuring business rules in a decision core engine. Specifically, FIG. 8A illustrates an embodiment server method 800 for configuring business rules via a business rules domain (BRD) interface 304 module that provides a single, holistic, cross-functional interface to support the definition and modeling of a telecommunication network operator's business requirements for policy controls, charging, subscriber management and other dynamic service optimization functions.

In operation 822, the BRD interface 304 may receive new business rules defined by an administrator 802 module and/or a user. The business rules may include information for determining how products or services are to be charged to the customer, how the service is to be delivered over the network, and other terms and conditions (e.g., when a subscriber may enter a roaming state, when a subscriber is to be determined as being in a roaming state, etc.). In an embodiment, the administrator 802 module may define business rules by receiving user input, performing computations, receiving notifications, accessing the BRD interface 304, accessing published elements of the BRD interface 304, etc. In an embodiment, the business rules may be defined directly in the BRD interface 304 in response to the BRD interface 304 receiving user input (e.g., from an user having administrative-level access privileges, etc.).

In operation 824, the BRD interface 304 may store the new business rules and related data in DCE tables 512. In operation 826, the BRD interface 304 may receive a confirmation message indicating that the rules have been stored successfully. In operation 828, the BRD interface 304 may store and/or update business rules logic in a DCE decision logic 506 module. In operation 830, the BRD interface 304 may receive a confirmation message from the DCE decision logic 506 module indicating that that logic has been stored/updated successfully. In operation 832, the BRD interface 304 may send a notification message to the administrator 802 module and/or user to indicate that the new business rules and corresponding logic have been stored/updated in the DCE.

FIG. 8B illustrates an embodiment server method 850 for configuring business rules via a business rules domain orchestrator (BRDO) 302 component that provides a well-defined integration point for an external system 323 to interface with a decision core engine (DCE) and enable business rules and decision criteria to be configured in the existing environment. In operation 852, an external system 323 may define or receive new business rules, which may include information for determining how products or services are to be charged to the customer, how the service is to be delivered over the network, terms and conditions, etc. In various embodiments, the external system 323 may define the new business rules in response to receiving user input (e.g., from a user having administrative-level access privileges, etc.) and/or receive the new business rules from an administrator 802 module.

In operation 854, the BRDO 302 component may receive new business rules information from the external system 323. In operation 856, the BRDO 302 component may store new business rules decision data in a DCE table, such as via a DCE tables 512 module. In operation 858, the DCE tables 512 module may send a confirmation message to the BRDO 302 component. In operation 860, the BRDO 302 component may store or update new business rules logic in the DCE decision logic 506 module. In operation 862, the BRDO 302 component may receive a confirmation message from the DCE decision logic 506 module.

In operation 864, the BRDO 302 component may confirm the successful definitions of new business rules by sending a confirmation message to the external system 323. In operation 866, the external system 323 may send the confirmation message to the administrator module 802 for delivery to the user.

Figure 9:
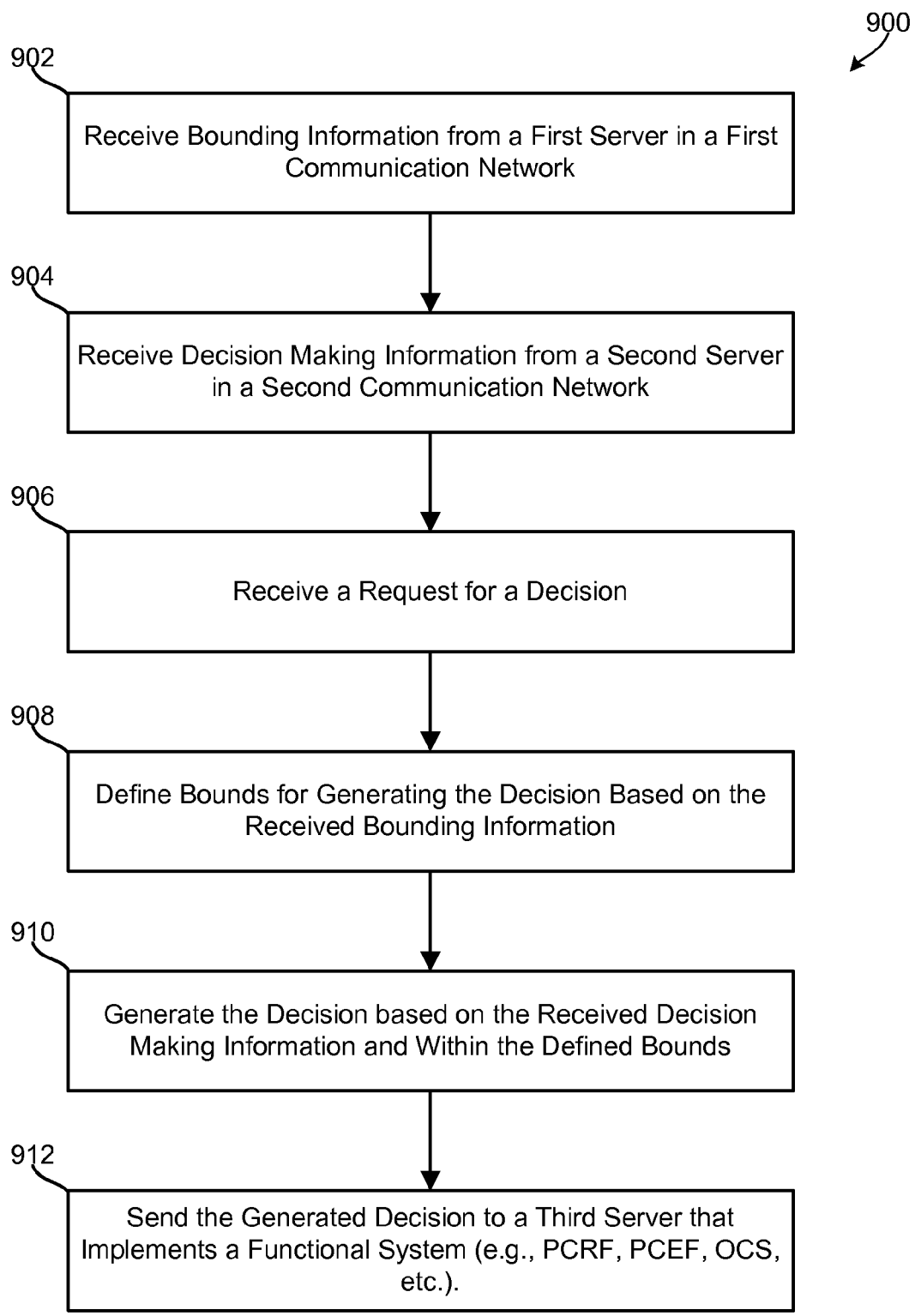
FIG. 9 is a process flow diagram illustrating an embodiment server method of controlling telecommunication services.

FIG. 9 illustrates an embodiment method 900 of controlling services. In operation 902 a communication server may receive bounding information from a first server computing device in a first communication network. In operation 904, the communication server may receive decision making information from a second server computing device in a second communication network. In operation 906, the communication server may receive a request for a decision. In operation 908, the communication server may define bounds for generating the decision based on the received bounding information. In operation 910, the communication server may generate the decision based on the received decision making information and so that the decision is within the defined bounds. In operation 912, the communication server may send the generated decision to a third server computing device implementing a functional system.

Figure 10:
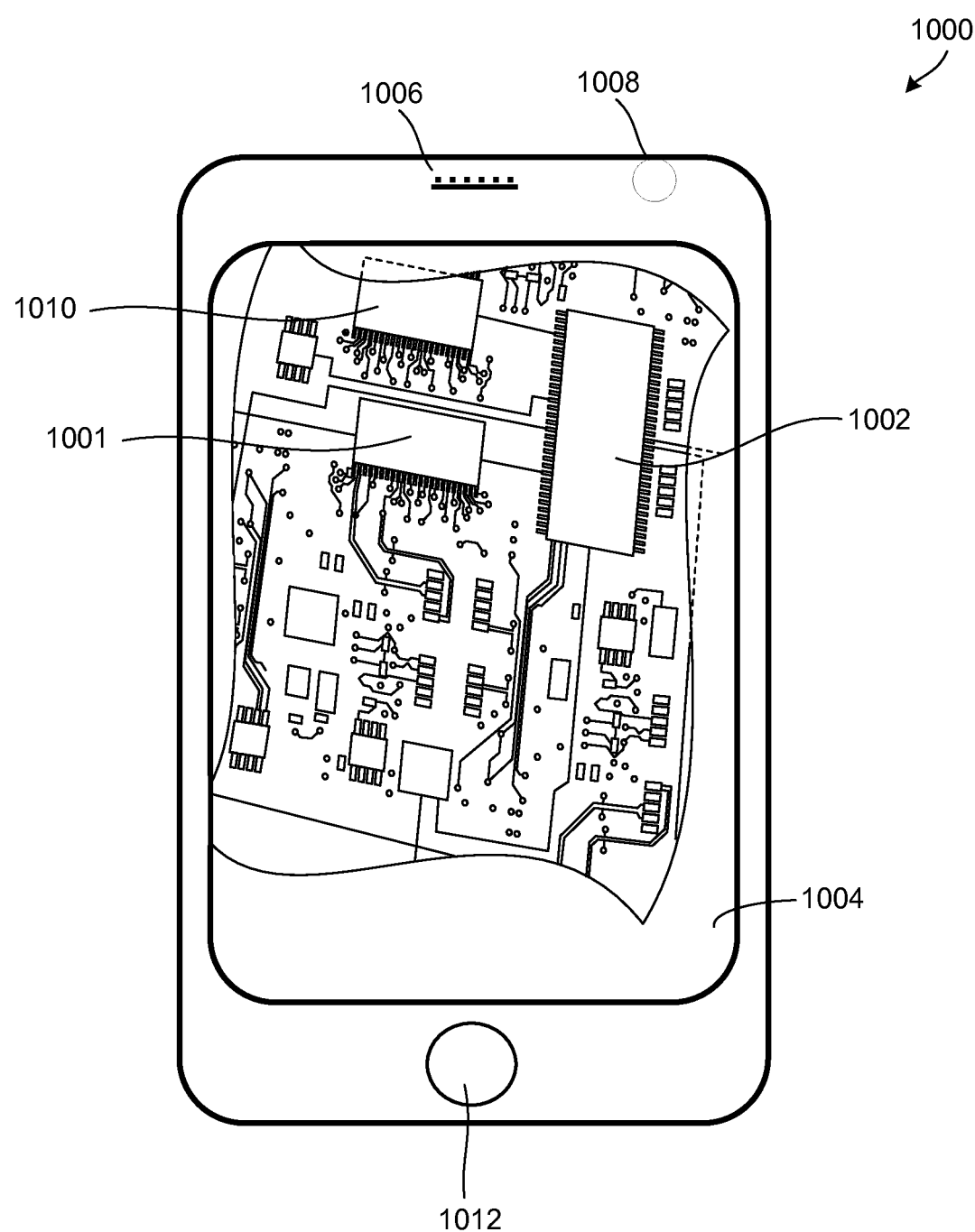
FIG. 10 is a system block diagram of a user equipment device in the form of a phone/cell phone suitable for use with various embodiments.

FIG. 10 is a system block diagram of a user equipment device in the form of a phone/cell phone suitable for use with various embodiments. A cell phone 1000 may include a processor 1001 coupled to internal memory 1002, a display 1004, and to a speaker 1006. Additionally, the cell phone 1000 may include an antenna 1008 for sending and receiving electromagnetic radiation that may be connected to a wireless data link and/or cellular telephone transceiver 1010 coupled to the processor 1001. Cell phones 1000 typically also include menu selection buttons 1012 or switches for receiving user inputs.

Figure 11:
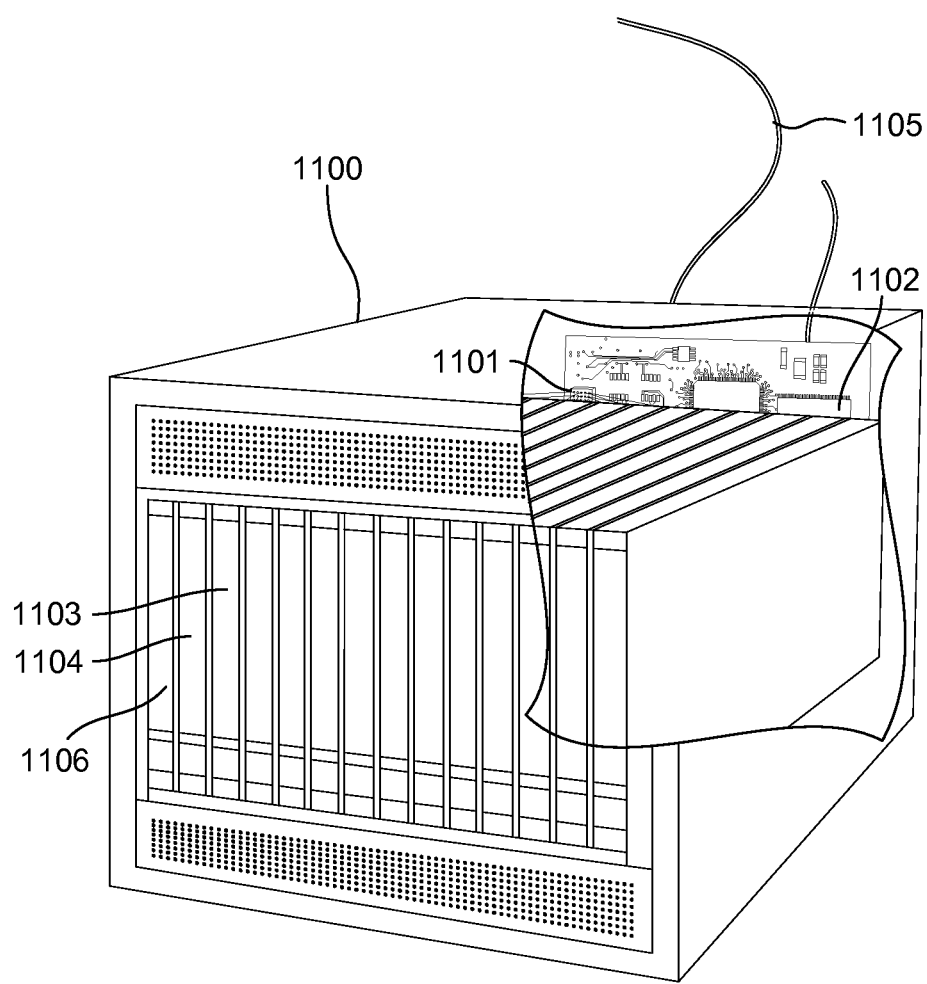
FIG. 11 is a system block diagram of a server suitable for implementing various embodiments.

The various embodiments may be implemented on any of a variety of commercially available server devices, such as the server 1100 illustrated in FIG. 11. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1106 coupled to the processor 1101. The server 1100 may also include network access ports 1104 coupled to the processor 1101 for establishing data connections with a network 1105, such as a local area network coupled to other operator network computers and servers.

The processors 1001, 1101 may be any programmable microprocessor, microcomputer or multiple processor chip or chips that can be configured by software instructions (applications) to perform a variety of functions, including the functions of the various embodiments described below. Multiple processors 1001, 1101 may be provided, such as one processor dedicated to wireless communication functions and one processor dedicated to running other applications. Typically, software applications may be stored in the internal memory 1002, 1102, 1103 before they are accessed and loaded into the processor 1001, 1101. The processor 1001, 1101 may include internal memory sufficient to store the application software instructions.

The foregoing method descriptions and the process flow diagrams are provided merely as illustrative examples and are not intended to require or imply that the steps and operations of the various embodiments must be performed in the order presented. As will be appreciated by one of skill in the art the order of steps and operations in the foregoing embodiments may be performed in any order. Words such as "thereafter," "then," "next," etc. are not intended to limit the order of the steps or operations; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, generators, engines, interfaces, systems, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of controlling services in a system that includes a plurality of independent communication networks, the method comprising:
   receiving in a processor bounding information from a first server computing device in a first communication network of the plurality of independent communication networks;
   receiving in the processor decision making information from a second server computing device in a second communication network of the plurality of independent communication networks;
   generating a requested decision core engine (DCE) decision based on the received decision making information and the received bounding information, wherein generating the requested DCE decision includes traversing a decision table to identify one or more actions corresponding to the decision making information, reorganizing an execution order of the identified actions based on probability values assigned to the identified actions, and executing the reorganized actions to generate a DCE decision result set; and
   sending the generated DCE decision result set to a third server computing device implementing a functional system.

2. The method of claim 1, wherein:
   generating the requested DCE decision further comprises generating a communication message that includes the decision table; and
   sending the generated DCE decision result set to a third server computing device implementing a functional system comprises sending the generated communication message to a server configured to execute operations based on information included in the decision table.

3. The method of claim 1, wherein receiving bounding information comprises receiving information that identifies an upper bound on a maximum amount of latency allowed per decision.

4. The method of claim 1, wherein receiving bounding information comprises receiving bounding information in a decision core engine included in a server included in one of:
   a policy management system;
   a policy enforcement system;
   a charging system; and
   a mobile application server system.

5. The method of claim 1, wherein receiving bounding information comprises receiving bounding information in a decision core engine dedicated to machine-to-machine services.

6. The method of claim 1, wherein receiving bounding information comprises receiving bounding information in a decision core engine dedicated to services provided by a third party partner.

7. The method of claim 1, wherein receiving bounding information comprises receiving bounding information in a decision core engine included in a sever of a cloud computing system.

8. A communications server comprising:
   a memory; and
   a processor coupled to the memory, wherein the processor is configured with processor-executable instructions to perform operations comprising:
     receiving bounding information from a first server computing device in a first communication network of a plurality of independent communication networks;
     receiving decision making information from a second server computing device in a second communication network of the plurality of independent communication networks;
     generating a requested decision core engine (DCE) decision based on the received decision making information and the received bounding information, wherein generating the requested DCE decision includes traversing a decision table to identify one or more actions corresponding to the decision making information, reorganizing an execution order of the identified actions based on probability values assigned to the identified actions, and executing the reorganized actions to generate a DCE decision result set; and
     sending the generated DCE decision result set to a third server computing device implementing a functional system.

9. A non-transitory computer readable storage medium having stored thereon processor-executable software instructions configured to cause a processor to perform operations comprising:
   receiving bounding information from a first server computing device in a first communication network of a plurality of independent communication networks;
   receiving decision making information from a second server computing device in a second communication network of the plurality of independent communication networks;
   generating a requested decision core engine (DCE) decision based on the received decision making information and the received bounding information, wherein generating the requested DCE decision includes traversing a decision table to identify one or more actions corresponding to the decision making information, reorganizing an execution order of the identified actions based on probability values assigned to the identified actions, and executing the reorganized actions to generate a DCE decision result set; and sending the generated DCE decision result set to a third server computing device implementing a functional system.

* * * * *